(12) United States Patent
Kecht et al.

(10) Patent No.: US 11,148,447 B2
(45) Date of Patent: Oct. 19, 2021

(54) INTAGLIO PRINTING INK, PRINTING PROCESS AND PRINTED ARTICLE

(71) Applicant: GIESECKE+DEVRIENT CURRENCY TECHNOLOGY GMBH, Munich (DE)

(72) Inventors: Johann Kecht, Munich (DE); Stephan Steinlein, Munich (DE); Thomas Giering, Kirchseeon (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 55 days.

(21) Appl. No.: 16/611,557

(22) PCT Filed: May 7, 2018

(86) PCT No.: PCT/EP2018/000241
§ 371 (c)(1),
(2) Date: Nov. 7, 2019

(87) PCT Pub. No.: WO2018/206144
PCT Pub. Date: Nov. 15, 2018

(65) Prior Publication Data
US 2021/0070080 A1 Mar. 11, 2021

(30) Foreign Application Priority Data
May 11, 2017 (DE) ...................... 10 2017 004 496.1

(51) Int. Cl.
*B41M 1/10* (2006.01)
*B42D 25/29* (2014.01)
(Continued)

(52) U.S. Cl.
CPC .............. *B41M 1/10* (2013.01); *B41M 3/144* (2013.01); *B42D 25/29* (2014.10); *B42D 25/382* (2014.10); *B42D 25/387* (2014.10); *C09D 11/037* (2013.01)

(58) Field of Classification Search
CPC .......... B41M 1/10; B41M 3/144; B41M 3/14; B42D 25/382; B42D 25/387; B42D 25/29; C09D 11/037
(Continued)

(56) References Cited

U.S. PATENT DOCUMENTS

| 3,755,222 A | 8/1973 | Gruber et al. |
| 4,244,741 A | 1/1981 | Kruse |

(Continued)

FOREIGN PATENT DOCUMENTS

| DE | 10326983 A1 | 12/2004 |
| DE | 102008049595 A1 | 4/2010 |

(Continued)

OTHER PUBLICATIONS

International Search Report and Written Opinion from PCT Application No. PCT/EP2018/000241, dated Jul. 17, 2018.

*Primary Examiner* — Justin V Lewis
(74) *Attorney, Agent, or Firm* — Workman Nydegger

(57) ABSTRACT

An intaglio printing ink includes capsule luminescent pigments and a further machine-readable feature substance. The capsule luminescent pigments include at least one core with a luminescent substance and one shell encapsulating the at least one core. They are characterized by their high luminescence intensity and high chemical stability, which enables a simultaneous loading of the intaglio printing ink with a further machine-readable feature. A printing method and a printed product include the intaglio printing ink.

17 Claims, 1 Drawing Sheet

(51) Int. Cl.
 *B42D 25/382* (2014.01)
 *B42D 25/387* (2014.01)
 *B41M 3/14* (2006.01)
 *C09D 11/037* (2014.01)
 *C09D 11/50* (2014.01)

(58) Field of Classification Search
 USPC ..... 283/72, 74, 75, 95, 96; 106/31.13, 31.27
 See application file for complete search history.

(56) References Cited

U.S. PATENT DOCUMENTS

| | | | |
|---|---|---|---|
| 5,569,701 | A | 10/1996 | Moynihan |
| 5,763,085 | A | 6/1998 | Atarashi et al. |
| 5,795,379 | A | 8/1998 | Schwenk et al. |
| 9,721,705 | B2 | 8/2017 | Choe et al. |
| 2006/0131425 | A1 | 6/2006 | Stenzel et al. |
| 2008/0087189 | A1 | 4/2008 | Lin et al. |
| 2010/0059691 | A1 | 3/2010 | Lewis et al. |
| 2014/0210200 | A1* | 7/2014 | Bornschlegl ......... B42D 25/373 283/85 |
| 2015/0235745 | A1 | 8/2015 | Choe et al. |
| 2018/0311991 | A1 | 11/2018 | Kecht et al. |
| 2018/0326776 | A1 | 11/2018 | Kecht et al. |

FOREIGN PATENT DOCUMENTS

| | | |
|---|---|---|
| EP | 1179507 A1 | 2/2002 |
| EP | 1548071 A1 | 6/2005 |
| EP | 1790701 A1 | 5/2007 |
| EP | 2602119 A1 | 6/2013 |
| WO | 9219689 A1 | 11/1992 |
| WO | 2008141972 A1 | 11/2008 |
| WO | 2008148201 A1 | 12/2008 |
| WO | 2013094993 A1 | 6/2013 |
| WO | 2017080652 A1 | 5/2017 |
| WO | 2017080653 A1 | 5/2017 |

* cited by examiner

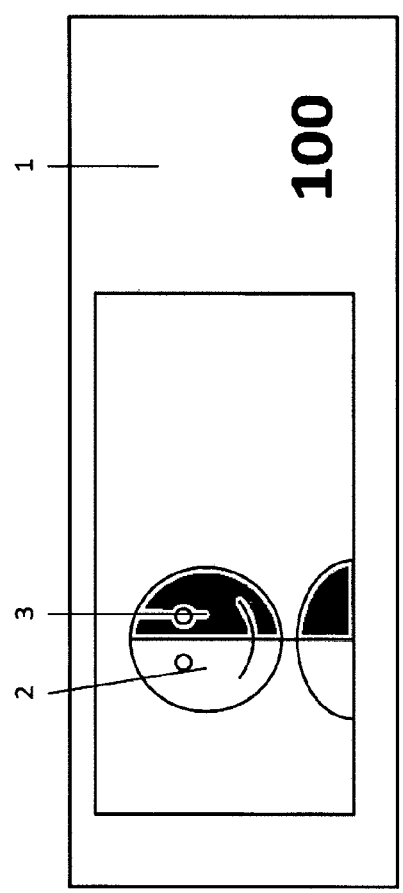

INTAGLIO PRINTING INK, PRINTING PROCESS AND PRINTED ARTICLE

BACKGROUND

The invention relates to an intaglio printing ink, a printing method and a printed product, respectively based on a combination of luminescent capsule luminescent pigments and at least one further machine-readable feature substance. The invention ensures the provision of multifunctional intaglio printing inks or intaglio inks as well as the provision of printed products obtainable by means of an intaglio printing method. In particular, the invention relates to luminescent printed products having multifunctional security features, for example luminescence and NIR absorption, or luminescence and magnetism.

The use of capsule luminescent pigments according to the invention makes it possible for the various functionalities to be realized at the same time, because by the high luminescence intensity and the good incorporability into printing inks a too high loading (i.e. pigmentation) of the printing ink can be advantageously avoided.

In addition, the intaglio printing ink according to the invention ensures additional advantageous effects, as a result of which new and improved security features can be generated. For example, a printed product equipped with NIR absorption and obtainable by means of intaglio printing can be provided, a luminescence being effected with the color white or with a complementary color of the color impression of the body color, which ensures a high recognition value and a high level of forgery resistance.

In the course of the manufacturing of bank notes and other value documents, the so-called intaglio printing method is usually employed. This makes it possible to generate regions with very high proof thicknesses, which can then be recognized e.g. haptically (so-called palpable printed patterns). Furthermore, machine-readable signals can be produced, e.g. by means of a loading with magnetic pigments or with substances absorbing in the infrared spectral region, etc. (hereinafter also referred to as "feature substances"). Intaglio inks necessarily also include, besides pigments and feature substances, further functional components which for example serve to adjust the viscosity and the wetting properties or determine the curing properties. The loading of the intaglio printing ink with pigments, feature substances and further functional components can become exceptionally high, in particular cases a content of up to 80 weight percent can be achieved here. Due to the high proof thickness and high pigmentation of intaglio printing inks, a particularly large amount of feature substance can be applied onto the value document by means of intaglio printing in order to produce a suitably high measurement signal for the detection of less intensive feature substances.

The designation "value document" is to be understood within the framework of the invention to refer to bank notes, checks, shares, tokens, identity cards, passports and also other documents as well as labels, seals, packages or other elements for product authentication.

Luminescent intaglio inks or intaglio printing inks are generally known. Typically, however, the printing ink of printed products which are equipped with magnetic or absorbing features and produced by intaglio printing is so heavily loaded with the feature substance and further functional components that a further loading, e.g. with inorganic luminescent substances, is no longer reasonably possible. Organic luminescent substances possess higher luminosities and therefore have to be used in significantly lower quantities. Thus, such organic luminescent substances could theoretically be additionally incorporated into an intaglio printing ink loaded with a feature substance. In practice, however, this results in significant disadvantages:

Due to the high proof thicknesses of the intaglio print, organic luminescent substances are dissolved out e.g. upon contact with organic solvents and lead to a "smearing" (or "running out" or also "bleeding") of the luminescence from the proof. The thick proof here forms, so to speak, a reservoir from which luminescent substance is continuously supplied, so that the effect here is stronger than for example with thin offset proofs.

This effect is particularly disadvantageous in luminescent ink systems that use mixtures of several different luminescent substances for producing in sum a certain color impression (e.g. a mixture of substances luminescing in red, in green and in blue in order to produce a white color impression of the luminescence). Here the susceptibility increases, since even in the case that one of the organic luminescent substances is be stable against a certain solvent, the other luminescent substances may be dissolved out by the solvent. Also in this case a smearing of the luminescent printed image or a change of the color impression of the luminescence can be observed.

This is particularly striking in printed products in which the color impression of the luminescence emission can be visually compared to a second color impression, e.g. when the color impression of the luminescence and the color impression of the body color are the same, or in the case of color tones with a high recognition value such as e.g. pure white luminescence.

The invention is therefore based on the object of providing improved intaglio printing inks which have both a luminescence emission and a further machine-readable feature. Here, in particular, the color impression of the luminescence emission should be freely adjustable within a color system and have a good stability against chemical and physical influences.

A further object is to provide a printing method and a printed product with these intaglio printing inks.

These objects are achieved by the feature combinations defined in the main claims. Preferred embodiments are subject matter of the subclaims.

SUMMARY OF THE INVENTION 1. (First aspect of the invention) Multifunctional intaglio printing ink including at least one capsule luminescent pigment and at least one further machine-readable feature substance,
wherein the at least one capsule luminescent pigment has at least one core with a luminescent substance and one shell encapsulating the at least one core,
wherein the core is based on a thermoplastic polymer or an organic addition polymer, and
wherein the luminescent substances respectively are organic or metalorganic luminescent substances and
wherein the shell consists of a condensation polymer or an organic addition polymer, and
wherein the intaglio printing ink at 40° C. has a viscosity in the region of 3 Pas to 25 Pas, preferably in the region of 5 Pas to 15 Pas. The shell preferably consists of a condensation polymer.

2. (Preferred configuration) Intaglio printing ink according to section 1 including at least two capsule luminescent pigments which have different emission spectra of the luminescence emission, wherein for each of the at least two capsule luminescent pigments the material of the at least one core, the material of the shell, and the thickness of the shell are mutually coordinated such that the at least two capsule luminescent pigments have a substantially same chemical stability. In particular, after a 5-minutes-exposure to toluene, ethyl acetate, hydrochloric acid (5%), sodium hydroxide solution (2%) and sodium hypochlorite solution (5% active chlorine), the difference between the luminescence intensities of the capsule luminescent pigments normalized to the initial value from each other is less than 20 percentage points, preferably less than 10 percentage points, particularly preferably less than 5 percentage points.

3. (Preferred configuration) Intaglio printing ink according to section 1 or 2, wherein the feature substance is selected from: NIR absorbers, magnetic substances and luminescent substances.

4. (Preferred configuration) Intaglio printing ink according to any of sections 1 to 3, wherein the feature substance has a portion of more than 10 weight percent, preferably more than 20 weight percent, particularly preferably more than 30 weight percent, in a further embodiment more than 40 weight percent in the intaglio printing ink. The weight portions respectively refer to the wet, unprinted intaglio printing ink.

5. (Preferred configuration) Intaglio printing ink according to any of sections 1 to 4, wherein the intaglio printing ink additionally includes at least one body color pigment.

6. (Preferred configuration) Intaglio printing ink according to any of sections 1 to 5, wherein the at least one feature substance, the at least one capsule luminescent pigment and, if included, the at least one body color pigment together have a portion of less than 80 weight percent, preferably less than 60 weight percent, particularly preferably less than 45 weight percent in the intaglio printing ink. The weight portions respectively refer to the wet, unprinted intaglio printing ink.

7. (Preferred configuration) Intaglio printing ink according to any of sections 1 to 6, wherein the shell of the at least one capsule luminescent pigment consists of a melamine-formaldehyde condensation polymer.

8. (Preferred configuration) Intaglio printing ink according to any of sections 1 to 7 combined with section 2, wherein the at least two capsule luminescent pigments respectively have the same condensation polymer as a shell material.

9a. (Preferred configuration) Intaglio printing ink according to any of sections 1 to 8, wherein the at least one capsule luminescent pigment is manufactured according to any of the methods of Variant 1, Variant 2 or Variant 3.

9b. (Preferred configuration, Variant 1) Intaglio printing ink according to any of sections 1 to 9a, wherein the at least one capsule luminescent pigment has at least one core based on a thermoplastic polymer, a shell based on a condensation polymer, and an organic or metalorganic feature substance present in the core in dissolved or finely distributed form, wherein the mass fraction of the shell is more than 25%, preferably 50%, particularly preferably more than 100% relative to the mass of the core.

9c. (Preferred configuration, Variant 1) Intaglio printing ink according to section 9b, wherein the thermoplastic polymer is chosen from polystyrene (PS), polyacrylates, polyethylene (PE), polypropylene (PP), polycarbonates (PC), polyamides (PA), polyurethanes (PU), polyureas (PH), polyethylene terephthalate (PET) or other polyesters, preferably from polystyrene (PS) or from one of polyacrylates, polymethyl methacrylate (PMMA), polyvinyl acetate (PVAC), polyvinyl chloride (PVC), polyacrylonitrile (PAN), acrylonitrile butadiene styrene copolymer (ABS), particularly preferably from polystyrene (PS) or polymethyl methacrylate (PMMA).

9d. (Preferred configuration, Variant 1) Intaglio printing ink according to section 9b or 9c, wherein the luminescent substance is present dissolved in the thermoplastic polymer.

9e. (Preferred configuration, Variant 2) Intaglio printing ink according to any of sections 1 to 9a, wherein the at least one capsule luminescent pigment has at least one core based on an organic addition polymer, a shell based on an organic condensation polymer, and an organic or metalorganic luminescent substance present in the core in finely distributed or dissolved form, wherein the addition polymer is a three-dimensionally crosslinked duromer.

9f (Preferred configuration, Variant 2) Intaglio printing ink according to section 9e, wherein the addition polymer is formed from trimeric isocyanate monomers, preferably isocyanurate trimers from isophorone diisocyanate and amines or alcohols, preferably amines.

9g. (Preferred configuration, Variant 2) Intaglio printing ink according to section 9e or 9f, wherein the amines are selected from monoamines, diamines and triamines and preferably comprise triamines.

9h. (Preferred configuration, Variant 2) Intaglio printing ink according to any of sections 9e to 9g, wherein the condensation polymer of the shell and the addition polymer of the core include at least one same monomer as a polymer constituent.

9i. (Preferred configuration, Variant 2) Intaglio printing ink according to any of sections 9e to 9h, wherein the condensation polymer of the shell includes melamine as a monomer and preferably at the same time the addition polymer of the core includes melamine as a monomer.

9j. (Preferred configuration, Variant 1 or 2) Intaglio printing ink according to any of sections 9b to 9i, wherein the condensation polymer of the shell is chosen from aminoplasts, phenoplasts, melamine formaldehyde resins (MF), melamine phenol formaldehyde resins (MPF), phenol formaldehyde resins (PF), urea formaldehyde resins (UF), melamine guanidine formaldehyde resins or phenol resorcin formaldehyde resins.

9k. (Preferred configuration, Variant 1 or 2) Intaglio printing ink according to any of sections 9b to 9j, wherein the at least one capsule luminescent pigment comprises exactly one core and one shell.

9l. (Preferred configuration, Variant 3) Intaglio printing ink according to any of sections 1 to 9a, wherein the at least one capsule luminescent pigment comprises:
  a duromer matrix, as well as
  embedded therein a plurality of cores made of a thermoplastic polymer, and
  an organic or metalorganic luminescent substance dissolved in the cores.

9m. (Preferred embodiment, Variant 3) Intaglio printing ink according to section 9l, wherein the thermoplastic polymer is selected from polystyrene (PS), polyacrylates, polymethyl methacrylate (PMMA), polyvinyl acetate (PVAC), polyvinyl chloride (PVC), polyacrylonitrile (PAN), acrylonitrile butadiene styrene copolymer (ABS), polyethylene (PE) or polypropylene (PP), polycarbonates (PC), polyamides (PA), polyesters or polyethylene terephthalate (PET).

9n. (Preferred embodiment, Variant 3) Intaglio printing ink according to section 9l or 9m, wherein the chain lengths of the thermoplastic polymer are in the region of 1000-1000000 g/mol, in particular at 50000-250000 g/mol.

9o. (Preferred embodiment, Variant 3) Intaglio printing ink according to any of sections 9l to 9n, wherein the duromer matrix comprises an addition polymer, preferably a mixture of different monoamines, diamines or triamines and a trimeric isocyanate monomer, particularly preferably the isocyanurate trimers of isophorone diisocyanate.

9p. (Preferred embodiment, Variant 3) Intaglio printing ink according to any of sections 9l to 9o, wherein the thermoplastic core particles in the duromer matrix are present in a concentration between 0.1 and 25 weight percent, in particular 3-20 weight percent.

10. (Preferred embodiment) intaglio printing ink according to any of sections 1 to 9o, wherein the at least one capsule luminescent pigment is excitable in the UV spectral region and emits in the visible spectral region.

11. (Preferred configuration) Intaglio printing ink according to any of sections 1 to 10, wherein the at least one capsule luminescent pigment is excitable with UVA radiation, preferably at a wavelength of 365 nm.

12. (Preferred configuration) Intaglio printing ink according to any of sections 1 to 10, wherein the at least one capsule luminescent pigment is excitable with UVC radiation, preferably at a wavelength of 254 nm.

13. (Preferred configuration) Intaglio printing ink according to any of sections 1 to 12, wherein in the at least one capsule luminescent pigment there are present two different luminescent substances in finely distributed or dissolved form, which form an energy transfer system in which the first luminescent substance after excitation transfers its excitation energy partially or completely to the second luminescent substance.

14. (Preferred configuration) Intaglio printing ink according to any of sections 1 to 12, wherein for the at least one capsule luminescent pigment upon a 5-minutes-exposure to toluene, ethyl acetate, hydrochloric acid (5%), sodium hydroxide solution (2%) and sodium hypochlorite solution (5% active chlorine) the luminescence intensity remaining after the test is higher than 80% of the initial intensity.

15. (Preferred configuration) Intaglio printing ink according to any of sections 1 to 14, wherein for the at least one capsule luminescent pigment, according to the test method A5 with acetone, the luminescence intensity remaining after the test is higher than 80% of the initial intensity.

16. (Preferred configuration) Intaglio printing ink according to any of sections 1 to 15 in combination with section 2, wherein the at least two capsule luminescent pigments have substantially the same chemical stability against acetone according to test method A5 and the luminescent intensity remaining after the test is higher than 80% of the initial intensity.

17. (Preferred configuration) Intaglio printing ink according to any of sections 1 to 16, wherein the at least one capsule luminescent pigment achieves a light fastness of at least blue wool scale 3 according to test method B.

18. (Preferred configuration) Intaglio printing ink according to any of sections 1 to 17 in combination with section 2, wherein the at least two capsule luminescent pigments have substantially the same light fastness, differ in particular according to test method B by less than 30 percentage points and achieve preferably at least blue wool scale 3.

19. (Preferred configuration) Intaglio printing ink according to section 17 or 18, wherein the light fastness of at least one capsule luminescent pigment is obtained by a mixture of differently lightfast luminescent substances.

20. (Preferred configuration) Intaglio printing ink according to any of sections 1 to 19 in combination with section 2, wherein the at least two capsule luminescent pigments have different color impressions of the luminescence emission.

21. (Preferred configuration) Intaglio printing ink according to any of sections 1 to 20 in combination with section 2, wherein the color impression of the luminescence emission of arbitrary mixtures of the capsule luminescent pigments shifts by less than $\Delta D<0.03$ at blue wool scale 1, preferably at blue wool scale 2, particularly preferably at blue wool scale 3, after UV irradiation according to test method B.

22. (Preferred configuration) Intaglio printing ink according to any of sections 1 to 21, which comprises at least three capsule luminescent pigments respectively having a different color impression of the luminescence emission, wherein the respective color impressions of the luminescence emission preferably are red, green or blue.

23. (Second aspect of the invention) Printing method comprising the printing of a print substrate with an intaglio printing ink according to any of sections 1 to 22 in the intaglio printing method.

24. (Preferred configuration) Printing method according to section 23, wherein the print substrate is a paper substrate or a polymer substrate or consists of a combination of paper and polymer. A combination of paper and polymer is, for example, a foil/paper/foil composite or a paper/foil/paper composite.

25. (Third aspect of the invention) Printed product obtainable by the printing method according to section 23 or 24.

26. (Preferred configuration) Printed product according to section 25, wherein the printed product is a value document, in particular a bank note.

27. (Preferred configuration) Printed product according to section 25 or 26, wherein at least a first part of the printed product is printed with a first intaglio printing ink according to any of claims 1 to 21 and at least a second part of the printed product not overlapping the first part is printed with a second intaglio printing ink, wherein the second intaglio printing ink is preferably defined according to any of sections 1 to 21.

28. (Preferred configuration) Printed product according to section 27, wherein the second intaglio printing ink can be distinguished from the first intaglio printing ink by a machine-readable feature.

29. (Preferred configuration) Printed product according to section 28, wherein the machine-readable feature is selected from: NIR absorption, magnetization, luminescence. In particular, the machine-readable feature is selected from: Spectrum of NIR absorption, intensity of IR absorption, magnetizability, remanence, coercive field strength, orientation of magnetic field, luminescence intensity, luminescence spectrum as well as temporal behavior of luminescence, in particular rise time and decay time.

30. (Preferred configuration) Printed product according to section 28 or 29, wherein the second intaglio printing ink does not include any machine-readable feature substance.

31. (Preferred configuration) Printed product according to section 28 or 29, wherein the second intaglio printing ink includes a different machine-readable feature substance than the first intaglio printing ink.

32. (Preferred configuration) Printed product according to sections 27 to 31, wherein the second intaglio printing ink differs from the first intaglio printing ink in the color impression of its body color.

33. Printed product according to any of sections 27 to 31, combined with section 5, wherein the color impression of the body color is the same for the first and the second intaglio printing ink.

BRIEF DESCRIPTION OF THE DRAWINGS

FIG. 1 is a bank note portrait printed by intaglio method.

DETAILED DESCRIPTION OF THE INVENTION

The capsule luminescent pigments of the invention ensure the provision of intaglio inks or intaglio printing inks which at the same time have both a machine-readable feature with high pigmentation and a solvent-stable luminescent coloring freely selectable within the framework of an ink system.

The capsule luminescent pigments here preferably have still further advantages, e.g. a high compatibility with intaglio printing inks, a grain size suitable for intaglio printing and a suitable light stability, these properties being substantially the same for all the pigments of the luminescence ink system. This avoids further disadvantages of prior-art luminescent ink systems, e.g. the segregation of pigments in the printing ink or a change in the luminescence color impression upon prolonged exposure to the sun.

Furthermore, due to the fact that the luminescence color impression can be chosen freely (within the limits of the color system used) it is possible to set particularly desirable color combinations or striking color contrasts. For example, with an intaglio print colored in pale blue color the luminescence can be set such that upon excitation of the luminescence the same pale blue color impression arises, which produces an effect with a high recognition value and at the same time represents a high hurdle for forgers, since even small deviations from the color tone can easily be ascertained by the direct comparison with the body color.

Alternatively, it is possible to choose the complementary color of the body color (e.g. orange) as the color impression of the luminescence, resulting in a particularly well recognizable visual effect.

Furthermore, a white color impression of the luminescence can be set, which likewise represents a high recognition value and a high hurdle for counterfeiters.

The possibility of creating intaglio printing inks with such preferred color combinations is a further advantage over the prior art.

The term "intaglio" refers to a gravure printing method commonly used for bank note printing (herein also referred to as "intaglio printing" or "steel intaglio printing"). Here, intaglio printing is per se already a security element typical of bank notes, as it produces a raised print that can be palpated with the fingers.

In intaglio printing, the printed image is engraved into a rotating printing roller, the engraving typically having a depth of 30 to 220 µm. This printing roller is supplied with printing ink by one or more stencil ink rollers, and also a pattern of several printing inks can be transferred to the printing roller. Subsequently, the excess printing ink is wiped off the raised areas of the printing roller so that the printing ink remains behind only in the depressions of the engraving.

The printing ink of the depressions of the printing roller is transferred under high pressure (up to 500 bar) to the substrate which for example can be paper or plastic in sheet or web form. The substrate deforms due to the high contact pressure. This deformation together with the high proof thickness leads to the typical palpability of intaglio prints.

Due to the special printing method, special printing inks are required for intaglio printing, so-called intaglio printing inks or intaglio inks. These are characterized by a high viscosity in the region of 1 Pas to 15 Pas, preferably in the region of 5 Pas to 10 Pas, particularly preferably in the region of 3 Pas to 8 Pas at 40° C. In addition, intaglio printing inks typically include a high portion (loading) of functional substances, e.g. pigments, fillers, feature substances, wetting agents, UV-curing resins, etc. The loading with functional substances is more than 20 weight percent, preferably more than 40 weight percent, in a further embodiment more than 60 weight percent.

If, however, the loading with pigments and feature substances is too high, no sufficient quantities of the other functional substances can be used, so that the printing properties of an intaglio printing ink deteriorate. The loading with pigments and feature substances must therefore be less than 80 weight percent, preferably less than 60 weight percent, particularly preferably less than 45 weight percent.

In addition to providing a tactile security feature, the high layer thickness of a print produced by intaglio method is also used to apply magnetic, absorbing or luminescent feature substances in sufficient quantities to a bank note in order to enable a readout by machine. Substances absorbing in the infrared spectral region, so-called NIR absorbers, are used particularly frequently here. The regions printed with the intaglio print are often colored so that the resulting print has a body color, for example a red portrait of a historical personality or a pale blue building. Usually, a part of the print is printed without the feature and a part of the print is printed with the feature, so that a so-called "split" is produced. For example, the left part of a red portrait may not include any NIR absorbers, but the right part of a portrait may include NIR absorbers. This is shown in FIG. 1: A bank note (1) has a portrait printed by intaglio method. The left part (2) consists of an intaglio printing ink with red body color impression without any further machine-readable features. The right part (3) consists of an intaglio printing ink with the same red body color impression which additionally includes an NIR absorber. Upon normal viewing with the eye, the red portrait appears to be uniform. Upon viewing with a suitable infrared remission measuring device, however, only the right part of the portrait appears, while the left part remains empty; this is a so-called infrared split. Analogously, from magnetic or luminescent features there can be created e.g. magnet splits or luminescence splits.

Examples of magnetic feature substances are magnetizable ferromagnetic and ferrimagnetic substances such as for example hard magnetic and soft magnetic iron oxides, ferrites such as e.g. manganese-zinc ferrites or strontium ferrite $SrFe_{12}O_{19}$, and metal particles such as iron or cobalt. As printing pigments there are employed particles made of these materials (e.g. $Fe_3O_4$ particles) as well as magnetic layer pigments or magnetic effect pigments, which consist of several individual layers on a platelet-shaped carrier material, only individual layers consisting of the magnetic materials (e.g. an $SiO_2$ platelet which is alternately coated with several layers of $TiO_2$, $SiO_2$ and $Fe_2O_3$). The magnetic feature substance is preferably a pigment with reduced body color on the basis of core-shell particles. Here, a magnetizable core with a strong body color, for example an iron oxide core, is surrounded by a special shell which modifies the body color of the pigments by interference effects and/or light scattering. For example, the print EP1548071A describes the coating of iron oxide with silica and/or titanium dioxide layers for producing arbitrary body colors. Furthermore, the prints U.S. Pat. No. 5,763,085, WO2008148201 A1, WO2013094993 A1 and EP1179507 A1 describe coated magnetic particles with white or reduced body color.

Examples of NIR absorbers as feature substances are inorganic NIR absorbers with strong absorption bands in the wavelength region between 800 nm and 2500 nm, for example certain borides as described in the print DE102008049595, among others, or indium tin oxide and other compounds as described in the print US 2010/0059691 A1, among others. The absorbing feature substances are preferably special NIR absorbers with no or only low body color, such as rare earth phosphates or special transition metal compounds and reduced heteropoly acids, which are described in the prints US 2008/0087189 A1, EP1790701 B2 and U.S. Pat. No. 4,244,741, among others.

Inorganic NIR absorbers possess several advantages over organic NIR absorbers, in particular in their stability with respect to chemicals and light. Furthermore, they can have specific signatures in their absorption spectrum, which allows them to be distinguished from other substances such as e.g. organic NIR absorbers, which is relevant for their employment as a security feature. In a preferred embodiment, the NIR absorber is therefore an inorganic NIR absorber.

However, in the security sector organic or inorganic NIR absorbers are also frequently used, which in turn may have specific absorption spectra which differ from those of the inorganic NIR absorbers. In a further preferred embodiment, thus, organic NIR absorbers are used. In particular, these are metalorganic pigments such as metal phthalocyanines (e.g. copper phthalocyanine). Further suitable classes are cyanines, naphthalocyanines, ammonium salts, rare earth complexes and transition metal complexes, for example nickel, palladium and platinum complexes.

Substances such as carbon black are not preferred, as this is a non-specific organic NIR absorber with a strong body color.

Examples of luminescent feature substances are luminescent inorganic substances, preferably phosphorescent substances with a decay time of more than 250 µs, as this enables a simple machine evaluation of the phosphorescence emission spectrum.

Preferably, the luminescent substances are oxides, oxysulphides or sulphides, for example a zinc sulphide doped with copper, manganese or silver. Preferably, the luminescent substance is a matrix doped with transition metals or rare earth cations, for example $CaSiO_3$:Mn or $LaPO_4$:Ce, Tb. Preferably, the luminescent substance is excitable in the UV region, particularly preferably at 365 nm. Preferably, the luminescent substance emits in the VIS region between 400 nm and 700 nm.

The loading of the ink with the feature substance is usually very high, e.g. 25 weight percent, in order to generate a sufficient signal intensity. A significant increase, e.g. for incorporating further feature substances, is then no longer possible or only possible with a massive deterioration of the printing properties, since the intaglio printing ink must also necessarily include further components such as wetting agents or resins. It is therefore possible, for example, to load an intaglio printing ink with 25 weight percent of a magnetic pigment and another intaglio printing ink with 40 weight percent of an inorganic luminescent substance. However, a multifunctional intaglio printing ink which includes both substances at the same time with a total of 65 weight percent of pigmentation can no longer be reasonably manufactured.

As already described, this problem can be solved by using organic luminescent substances, which, due to their higher efficiency, then only require e.g. an ink load of 2 weight percent, so that a multifunctional intaglio printing ink as described in the previous paragraph only requires a pigmentation of 27 weight percent, which does not lead to a significant influence on the printing properties. But as already described, this results in disadvantages which, however, are avoided by the capsule luminescent pigments according to the invention. Furthermore, as already described, there result several advantages by the use of such pigments.

In order to further minimize the negative effect of additional pigmentation of the printing ink, it is useful to choose the surface of the capsule luminescent pigments such that it has a good compatibility with the formulation of the printing inks. Preferably, all different capsule luminescent pigments of the luminescence ink system (e.g. red-luminescing pigments, green-luminescing pigments and blue-luminescing pigments) have the same type of shell. This prevents a segregation of the different capsule luminescent pigments in the printing ink and also ensures good incorporability into the printing ink.

Polymers based on melamine formaldehyde (MF) have a particularly high compatibility with most common intaglio printing inks. For example, MF particles are often used as additives to improve the printing properties in printing inks. Therefore, the shell of the capsule luminescent pigments preferably consists of a condensation polymer, particularly preferably MF polymer. In this case, condensation polymers refer in particular to MF-analogous condensation polymers, such as e.g. urea formaldehyde or melamine phenol formaldehyde.

In a preferred embodiment, the intaglio printing ink includes more than 10 weight percent, preferably more than 20 weight percent, especially more than 40 weight percent of the feature substance. The intaglio printing ink preferably includes less than 10 weight percent of capsule luminescent pigments, particularly preferably less than 5 weight percent, very particularly preferably less than 2 weight percent.

The machine-readable feature substance is preferably an inorganic feature substance. In a preferred embodiment, it is an inorganic magnetic pigment. In a further preferred embodiment, it is an inorganic NIR absorber pigment. In a further preferred embodiment, it is an inorganic phosphorescence pigment.

In a preferred embodiment, the printing ink includes a color pigment to set the visual color impression of the proof (the body color). Such a pigment is hereinafter referred to as "body color pigment". In this variant, one has thus an intaglio printing ink with at least three types of pigments: a body color pigment, a feature pigment (feature substance) and the capsule luminescent pigments.

In a preferred embodiment, the printing ink has no or only a low inherent color (so-called "clear intaglio"). Here, special pigments with a low inherent color are employed as feature substances which often have a lower efficiency compared to conventional colored feature substances and therefore have to be pigmented higher in the printing ink. Therefore, the employment of capsule luminescent pigments according to the invention is particularly advantageous here in order to not exceed the maximum applicable pigmentation in the printing ink or to influence the printing properties as little as possible in a negative way.

In a preferred embodiment, the machine-readable feature substance has no or only a very low body color and the printing ink includes a color pigment for setting the body color. The low inherent color of the feature substance allows here, among other things, to set color tones which would not be possible with strongly colored feature substances, such as e.g. dark-brown magnetic pigments. Furthermore, an adjusting of the body color between the printed regions including the feature substance and the printed regions including no feature substance of a split is facilitated.

In a preferred embodiment, the intaglio printing ink is darkly colored, particularly preferably black. Preferably, the color impression of the luminescence is bright, particularly preferably white.

In a preferred embodiment, the different regions of a split possess a different color impression of the luminescence.

The luminescence ink system is characterized in that the different capsule luminescent pigments respectively have comparable chemical and physical stabilities. This prevents a non-uniform change of the luminescence color impression by chemical and physical factors (e.g. migration, environmental influences, organic solvents, acids and bases, UV irradiation, daylight).

The capsule luminescent pigments of the invention consist of at least one core made of a first material, in which a luminescent substance is distributed, and of a shell made of a second material. Preferably, the first and the second material are different polymers.

Here, two basic forms of capsule luminescent pigments exist: (a) capsule luminescent pigments with a single core and (b) capsule luminescent pigments with several cores.

According to a preferred embodiment, the capsule luminescent pigments are capsule luminescent pigments with one single core. There is present one single core which is surrounded by a shell. This achieves an especially high protection against chemicals, because the shell can homogeneously surround the core. This embodiment thus offers qualitative advantages.

According to a further preferred embodiment, the capsule luminescent pigments are capsule luminescent pigments with several cores. Here, several cores distributed in a shell material are present. As it is possible here that individual cores are located at or near the outer surface and thus experience less protection by the shell, a less strong protective effect against chemicals, in comparison to capsule luminescent pigments with one single core, is achieved here. However, such particles can be manufactured significantly more cost-effectively and still have a high chemical stability.

This embodiment thus offers manufacture-technology advantages.

According to a preferred embodiment, all capsule luminescent pigments of the luminescence ink system have the same shell, the shell being preferably based on a condensation polymer, particularly preferably based on a melamine formaldehyde condensation polymer. Preferably, these are capsule luminescent pigments with one core and one shell.

According to a further preferred embodiment, all capsule luminescent pigments of the luminescence ink system have the same shell, the shell being preferably based on an addition polymer, particularly preferably on an isocyanate-based addition polymer which includes, among others, melamine as a monomer. Preferably, these are capsule luminescent pigments with several cores and one shell.

According to a preferred embodiment, the capsule luminescent pigments of the invention have very thick shells, that is, the weight portion of the shell relative to the weight portion of the core is more than 20%, preferably more than 30%, particularly preferably more than 50%.

In the following, three preferred variants are stated, which describe suitable capsule luminescent pigments.

Variant 1: Capsule Luminescent Pigments with a Core from Thermoplastics and a Condensation-Polymer Shell According to the present variant, the luminescent substances are embedded in a thermoplastic polymer core, e.g. from polymethyl methacrylate (PMMA) or polystyrene (PS) and are encased in a shell from a crosslinked polar condensation polymer, e.g. from melamine formaldehyde resin (MF). The shell from MF protects the luminescence substance, as a result of its quality as a crosslinked insoluble polymer, in particular from organic solvents. The core from PMMA or PS protects the luminescent substances from aqueous or strongly polar solvents which could diffuse through the MF. Furthermore, PMMA and PS take up most of the luminescent substances very well and thus enable the homogeneous distribution thereof in the core material. Besides PMMA/PS and MF, also other types of polymers having similar properties can be used to produce analogous capsule luminescent pigments.

A custom, multi-level protection against a broad spectrum of chemical attacks is achieved.

Subject matter of the present variant 1 is in particular a special method for manufacturing capsule luminescent particles from a thermoplastic non-crosslinked polymer (e.g. PMMA, PS) and a strongly crosslinked, polar condensation polymer (MF).

Here, solvent-containing drops are formed, encased and subsequently the solvent is removed so that finally encased solid cores are obtained.

The non-crosslinked (core) polymer together with a luminescent substance is dissolved in an organic solvent and dispersed in the form of small droplets with the help of an emulsifier. Subsequently, the droplets are encased by weakly crosslinked shell material, the solvent is removed from the core (which causes the core polymer to precipitate in the core together with the luminescent substance distributed therein) and subsequently the shell is locked by further crosslinking.

The first process step is based on the emulsification of droplets of organic solvents in water. For this, only such solvents are suitable, which in water form a separate phase, that is, are not or hardly mixable with water. Such solvents include, for example, certain esters such as ethyl acetate, certain aromatic solvents such as toluene and benzene, certain ethers such as THF, and certain halogenated solvents. As an organic solvent there is preferably used a chlorinated solvent, as for example chloroform, dichloromethane, 1,1,1-trichloroethane, trichloroethylene or tetrachloroethylene.

As a core polymer there are suitable all the polymers soluble in the preferred organic solvents, preferably polymers soluble in chlorinated solvents. For increasing the solubility, the polymers of the core material are preferably unbranched or only weakly branched.

The chain lengths of the polymers of the core material here preferably lie in the region of 1000 to 1 000 000 g/mol, particularly preferably at 50 000 to 250 000 g/mol.

The polymer of the core material consists of thermoplastics, preferably of a thermoplastic, non-crosslinked polymer. According to a preferred embodiment, the polymer of the core material consists of polymerized ethylene derivatives, particularly preferably of polystyrene (PS) or polyacrylates, including preferably polymethyl methacrylate (PMMA), polyvinyl acetate (PVAC), polyvinyl chloride (PVC), polyacrylonitrile (PAN) or of a copolymer including two or several of these polymers, such as e.g. acrylonitrile butadiene styrene copolymer (ABS). According to a further preferred embodiment, the ethylene derivatives are polyethylene (PE), polypropylene (PP) or other polymers constructed from aliphatic carbon chains.

According to a further preferred embodiment, the polymer of the core material consists of polycarbonates (PC), polyamides (PA), or polyesters such as polyethylene terephthalate (PET).

As tensides or emulsifiers substances are suitable which can disperse the respective organic solvent in water, for example non-ionic tensides, anionic tensides, cationic tensides, amphotere tensides. There are preferably used anionic tensides or a mixture of anionic tensides and non-ionic tensides. Preferred anionic tensides are sulfate-based tensides, e.g. fatty alcohol sulfates (alkyl sulfates) or fatty alcohol ether sulfates. According to a further embodiment, the preferred anionic tensides are carboxylate-based tensides, e.g. alkyl carboxylates. According to a further embodiment, the preferred anionic tensides are sulfonate-based tensides, e.g. alkyl sulfonates. According to a further embodiment, the preferred anionic tensides are phosphate-based tensides, e.g. alkyl ether phosphates.

Anionic tensides have the advantage that the negative charge of the headgroup promotes the accumulation of positively charged condensation products from the shell formation.

The tensides are preferably employed in a quantity of 0.0001 to 10 wt. % aqueous solution, further preferably 0.1 to 5 wt. %, particularly preferably 0.5 to 2 wt. %.

The organic phase including the polymer (and the luminescent substance) is dispersed in the aqueous phase with the help of the tenside.

Preferably, the portion of dissolved polymer in the organic solvent is 1 to 20%, particularly preferably 3 to 10%.

Preferably, the portion of organic phase is 1 to 60 vol. % of the phase mixture, particularly preferably 10 to 30 vol. %. With smaller portions only lower yields are achieved, larger portions make the homogeneous dispersion of the organic phase more difficult, which has an adverse effect on the efficiency of the method.

The dispersion of the organic phase in the aqueous phase is preferably effected mechanically, e.g. by stirring, ultrasound or special devices for the targeted incorporation of shear forces. Homogenizing systems such as e.g. so-called homogenizer units or rotor-stator systems such as e.g. systems of the Ultra-Turrax type of the IKA company are preferably used.

Dispersing the organic phase in the aqueous phase can be effected one time or continuously. With a onetime dispersing, the dispersion is set to be effected at the start of the reaction, e.g. by a short treatment with a homogenizing system, and in the further course is stirred or intermixed e.g. only by a second system which is not suitable for dispersing. The homogenizing system is thus only employed for a short time, but the dispersion remains stable even without a further employment. With continuous dispersing the homogenizing system is employed over the entire reaction time. Here, normally, no second system is required for stirring/intermixing the reaction solution.

The polymers of the shell material are preferably strongly crosslinked thermosetting plastics. According to a preferred embodiment, the polymer of the shell material consists of units polymerized by condensation reactions, such as e.g. aminoplasts and phenoplasts, particularly preferably of aminoplasts. Preferably, these are melamine formaldehyde resins (MF), melamine phenol formaldehyde resins (MPF), phenol formaldehyde resins (PF), urea formaldehyde resins (UF), as well as resin types related thereto, e.g. melamine guanidine formaldehyde resins or phenol resorcin formaldehyde resins. According to a further preferred embodiment, in the resin material the formaldehyde is replaced completely or partly by a different aldehyde, e.g. by furfural.

For producing the shell, preferably a water-soluble prepolymerizate is employed. For this there can be employed both commercially obtainable prepolymerizates (e.g. Cymel 300 of the Allnex company) or prepolymerizates manufactured from the respective individual components, e.g. melamine and formaldehyde, by heating in an aqueous solution.

The prepolymerizate preferably includes methylolized amines, in particular methylolized melamine.

The prepolymerizate can be incorporated in the aqueous phase before, during or after the incorporation and dispersing of the organic phase and the aqueous phase. Preferably, the prepolymerizate is added after the dispersing of the organic phase, because often a more homogeneous droplet size of the dispersed phase can be achieved.

According to a preferred case of application, the entire required quantity of prepolymerizate is added all at once.

According to a further preferred case of application, the required quantity of prepolymerizate is added in portions, for example one half at the start of the reaction and the second half after the removal of the organic solvent.

According to a further preferred case of application, the prepolymerizate is continuously added over the entire reaction time or over parts of the reaction time, for example, via an electronically controlled dosing pump.

The quantities added and the times of addition can influence the density of the formed shell, because e.g. by an addition in portions the defects which arose in a first step of the shell formation can be filled and altogether a more controlled growth of the layer is made possible. It is particularly preferred that a part of the prepolymerizate is added only after the organic solvent has been completely removed.

If the entire prepolymerizate is added only after the organic solvent has been removed, no sealing layer formation takes place. The presence of the organic solvent is an integral part for the accumulation of the MF shell, an accumulation to "naked" already precipitated core material does not take place.

For controlling the speed and the magnitude of the polymerization of the prepolymerizate, the pH value is set. The setting can be effected at the beginning of the reaction and remain constant or can be altered step by step or continuously. According to a preferred embodiment, the pH value is set at the reaction start and is left constant over the reaction time. According to a further preferred embodiment, the pH value is adjusted at certain points in time in the reaction course, for example, the pH value is not adjusted at the beginning of the reaction, is set at the first value by the addition of acid at a later point in time, and is set at the second value by further addition of acid at an even later point in time. According to a further preferred embodiment, the pH value is continuously altered over the entire course of the reaction or over parts of the course of the reaction, for example by an electronically controlled dosing pump which meters an acid solution into the reaction solution.

The adjustment of the pH value is effected via the addition of acids or buffer systems. Preferably, organic acids with a pKs value in a region of 3.5 to 5.5 are employed, for example acetic acid, or buffer systems which are based on such acids and their salts, for example a formic acid formate buffer.

The adjustment of the pH value is here preferably effected within a region of pH 7 to pH 2, particularly preferably pH 6 to pH 3.

Independent of the reaction course of the condensation reaction of the shell, a lowering of the pH value (also to values lower than for example pH 1) can be effected at the end of the reaction, so as to facilitate the reprocessing (filtration) by an agglomeration of the particles.

Besides the pH value, the temperature of the reaction solution is an important control parameter for both the condensation reaction of the shell material and the removing of the organic solvent. According to a preferred embodiment, the temperature is increased step by step, e.g. from room temperature after a certain reaction time to 40° C. and then after a certain further reaction time from 40° C. to 80° C. According to a further preferred embodiment, the temperature is continuously altered over the entire reaction time or over parts of the reaction time.

According to a preferred embodiment, for removing the organic solvent, the temperature is kept near the boiling point of the organic solvent. Preferably, the holding temperature here is not less than 10° C. away from the boiling point of the solvent, particularly preferably not less than 5° C. However, the holding temperature preferably is not at or higher than the boiling point of the organic solvent, because this could impair the integrity of the shell.

According to a preferred embodiment, instead of or in addition to the rise of the temperature there is applied a negative pressure in order to achieve the removing of the organic solvent.

According to a preferred embodiment, the removing of the organic solvent is effected, without applying a negative pressure and without additional temperature increase, by stirring at room temperature over a certain period.

The curing of the shell material preferably takes place in the temperature region of 50° C. to 100° C., particularly preferably in the temperature region of 70 to 80° C.

Preferably, the removal of the solvent takes place over a period of at least 20 minutes, the period being particularly preferably at least 1h. Preferably, the curing of the shell material preferably takes place over a period of at least 30 minutes, the period being particularly preferably at least 1h.

The size of the resultant capsule luminescent pigments is here preferably 0.1 μm to 20 μm, further preferably 0.5 μm to 5 μm, particularly preferably 1 μm to 3 μm.

Preferably, the mass fraction of the shell is more than 20% of the mass of the core material, further preferably more than 50% of the mass of the core material, particularly preferably more than 100% of the mass of the core material.

The portion of the luminescent substance in the core material is preferably between 0.01 to 30 weight percent, further preferably between 0.1 to 20 weight percent, particularly preferably between 1 and 15 weight percent.

Variant 2: Capsule Luminescent Pigments with a Core from Duromers and a Condensation-Polymer Shell This variant includes an advantageous development of the method known from the print U.S. Pat. No. 5,795,379 A for incorporating luminescent substances into a solid resin. The method includes a further refinement step for protecting the printing ink including the luminescent pigment (or the value document) against the usually typical migration or the so-called "bleeding" by increasing the solvent stability of the luminescent pigments. In this step, a protecting shell made of a condensation polymer is applied around the duromer resin (which includes e.g. one or several luminescent substances and is ground to the desired grain size), so that capsule luminescent pigments arise.

The duromer core is preferably an addition polymer, in particular polyurethane or polyurea.

While polyurethanes/polyureas in a reaction extrusion without special, dry reaction conditions (protective gas, vacuum, chemical additives, etc.) always have a certain porosity (see U.S. Pat. No. 3,755,222), the condensation of melamine formaldehyde resins ("MF resins") or of other polycondensation polymers runs without gas-induced pore formation, because none of the monomers releases carbon dioxide upon contact with water. On the other hand, the direct employment of MF resins as a core material or as the polymer carrying the luminescent substances entails other technical disadvantages with respect to grindability, receptivity and processability.

Hence, the present variant combines the advantages of the simple and readily scalable production of polyaddition-resin-based luminescent pigments with the chemical-resistant properties of melamine formaldehyde resins by condensing a protecting shell from melamine formaldehyde resin onto a polyaddition resin core loaded with luminescent substances.

This process step makes it possible to protect soluble or unstable luminescent substances against external influences, such as acid contact or base contact, contact with organic solvents, extreme climatic conditions or contact with reducing or oxidizing substances.

According to a preferred embodiment, in a first step the luminescent substance to be protected is incorporated into a duromer matrix according to the print U.S. Pat. No. 5,795,379 A. For this, the luminescent substances can be extruded or kneaded together with the raw materials of the resin type used (for example a polyurethane resin or polyurea resin). The preferred concentration of the luminescent substances in the mixture lies in a region of 0.1% to 25%, particularly preferably in a region of 3% to 20% (weight percent). After termination of the extrusion process or kneading process the resins obtained and including the luminescent substances are ground into resin powder, the grain size being chosen according to the desired print application.

According to a preferred embodiment, for producing the core polymer particles dosed with luminescent substance, a mixture of a trimeric isocyanate monomer, preferably the isocyanurate trimer of isophorone diisocyanate, and various monoamines, diamines or triamines is heated to 150° C. to 250° C., preferably 180° C., in an industrial kneader and, in doing so, kneaded until hardening.

According to a further preferred embodiment, for producing the core polymer particles dosed with luminescent substance, a mixture of a trimeric isocyanate monomer, preferably the isocyanurate trimer of isophorone diisocyanate, and various monoamines, diamines and triamines is extruded at temperatures in a region of 5° C. to 250° C. with an increasing temperature profile in a screw extruder. Alternatively, as a core material there can be used any other three-dimensional crosslinked isocyanate-based duromers, for example polyurethane resins.

After the termination of the extrusion process or kneading process the obtained brittle resin powders including the luminescent substances are ground to the grain size corresponding to the desired application.

From this first cost-effective and well scalable extrusion step or kneading step one obtains a printable powder in the appropriate grain size. However, these pigments still possess a porous or accessible surface which makes the included organic luminescent substance attackable by external influences such as acid contact or base contact, contact with organic solvents, extreme climatic conditions (such as for example warm, humid air) or contact with reducing or oxidizing substances. The porous surface is the inevitable result from the reaction of water from the air with the isocyanate groups of the monomers under the conditions of the desired polyaddition reaction (heat) upon which gaseous carbon dioxide arises.

It is the subject matter of the variant, among other things, to introduce a coating step which removes this disadvantage. In this second step, the addition polymer pigments obtained in the first step are encased with a protecting polymer layer.

Preferably, the protecting polymer layer is a polycondensation polymer. Further preferably, the polycondensation polymer of the shell includes at least one same monomer as the polyaddition polymer of the core material, in order to promote a direct growth of the shell layer on the core material. Particularly preferably, this monomer is a melamine. The high functionality (three crosslinking groups per molecule) of melamine promotes a good growth and tight locking of the shell layer.

According to a preferred embodiment, the pigments to be coated and having a concentration ranging from 5 g/l to 50 g/l and a melamine formaldehyde prepolymer in a concentration ranging from 50 g/l to 250 g/l are stirred with a homogenizer at temperatures ranging from 60° C. to 80° C. at a pH value ranging from 3.5 to 6 for a duration ranging from one to four hours and thereby covered with a protecting shell. If the pH value is chosen too low, the formation of condensation germs in the reaction solution is promoted, which subsequently promotes the formation of condensation-polymer particles besides the security pigments to be coated. If one chooses the pH value too high, the condensation reaction is slowed down needlessly, because the reactivity of the melamine against the formaldehyde in the basic media strongly decreases (see D. Braun, W. Krausse, Angew. Macromol. Chem. 118 (1983) 165).

For the procedure of coating it is unimportant which luminescent substance was worked into the polyaddition polymer of the core material, because the determining surface properties (e.g. charge, chemical binding sites etc.) are decisively determined by the duromer matrix of the core. Hence, a universal method for the encapsulation of luminescent substances is described herein.

According to further preferred embodiments, also other condensation polymers can be used for the coating, such as for example melamine phenol formaldehyde resins, phenol formaldehyde resins as well as related resin types such as melamine guanidine formaldehyde resins or phenol resorcin formaldehyde resins.

Variant 3: Capsule Luminescent Pigments with Several Cores from Thermoplastics and an Addition-Polymer Shell The present variant 3 includes an advantageous development of the method known from the print U.S. Pat. No. 5,795,379 A for incorporating luminescent substances into a solid resin. In the present process, the luminescent substances are extruded not directly with the components of the resin, but are dissolved in spheres (or particles) from thermoplastic polymer in a preceding step. The concentration of the luminescent substance dissolved in the polymer is here preferably in a region of 0.01% to 30%. By this preceding process step it is possible, compared to an organic luminescent substance directly extruded into a resin, to achieve the same brightness of the end product with a substantially smaller quantity, e.g. 10% to 60%, of luminescent substance.

Cost savings are achieved here by the lower quantity of substance.

The present variant does explicitly not deal with core-shell particles having a defined uniform geometry, and in particular not with core-shell particles having a core and a shell, but with capsule luminescent particles having non-uniform geometry with several cores and one shell.

Another advantage of this variant lies in the stabilization of the organic luminescent substances dissolved in the thermoplastic polymer against aqueous acids and bases. A uniform encasing of the thermoplastic polymers with the encasing condensed resin is not decisive for this. The polymer including the luminescent substance (for example PMMA or PS) acts, as a result of its poor wettability with aqueous solutions, as a barrier against aqueous acids and bases and thus prevents the contact between the dissolved, labile luminescent substances and the acids and bases.

Embedding the stable polymer spheres in a resin further enables the easy setting of the pigment grain size advantageous for the respective printing process by means of grinding, which entails an easy and cost-effective scalability of the production process.

The manufacturing process has two stages. In the first manufacture step, the organic luminescent substance is dissolved in a thermoplastic polymer. For this, the polymer (for example PMMA or PS) together with the luminescent substance is dissolved in a suitable organic solvent (for example dichloromethane). So as to transition the polymer having the dissolved luminescent substance again into a solid form, one can choose from various synthesis pathways. Preferably, the polymer solution is dispersed in water with the help of a tenside (for example sodium dodecyl sulfate) and the solvent is removed from the mixture by simple evaporation. A further possibility is the precipitation of the polymer (including the dissolved luminescent substance) in diethyl ether with a subsequent grinding (in particular performed under cooling) into the desired grain size. The preferred grain size of the thermoplastic polymer particles is less than 7 µm, particularly preferably less than 3 µm.

The thermoplastic cores consist of thermoplastic polymers, preferably of a thermoplastic, non-crosslinked polymer. According to a preferred embodiment, the polymer of the core material consists of polymerized ethylene derivatives, further preferably of polystyrene (PS) or polyacrylates, including preferably polymethyl methacrylate (PMMA), polyvinyl acetate (PVAC), polyvinyl chloride (PVC), or polyacrylonitrile (PAN), or of a copolymer including one or several of the above-mentioned polymers, e.g. acrylonitrile butadiene styrene copolymer (ABS). According to a further preferred embodiment, the ethylene derivatives are polyethylene (PE), polypropylene (PP) or other polymers constructed from aliphatic carbon chains. According to a further preferred embodiment, the polymer of the core material consists of polycarbonates (PC), polyamides (PA), or polyesters, e.g. polyethylene terephthalate (PET).

The chain lengths of the polymers of the core material here preferably lie in a region of 1000 to 1 000 000 g/mol, particularly preferably in a region of 50 000 to 250 000 g/mol.

After the termination of the first synthesis step, polymer particles manufactured according to the above description are incorporated into a duromer matrix in the second manufacture step. For this, the polymer particle can be extruded or kneaded together with the raw materials of the resin type used (for example polyurethane resin). The preferred concentration of the polymer particle in the mixture lies in a region of 0.1% to 25%, particularly preferably in a region of 3% to 20% (i.e. weight percent). After the termination of the extrusion or kneading process the obtained resin including the polymer particle will be ground to a resin powder, wherein the grain size can be set with respect to the desired printing process.

According to a preferred embodiment, for producing the duromer matrix dosed with the thermoplastic cores, addition polymers are used. Here, preferably a mixture of a trimeric isocyanate monomer, preferably the isocyanurate trimer of isophorone diisocyanate, and various monoamines, diamines or triamines are heated to 150° C. to 250° C., preferably 180° C., in an industrial kneader and, in doing so, kneaded until hardening.

According to a further preferred embodiment, for producing the duromer matrix dosed with the thermoplastic cores, a mixture of a trimeric isocyanate monomer, preferably the isocyanurate trimer of isophorone diisocyanate, and various monoamines, diamines or triamines is extruded at temperatures in a region of 5° C. to 250° C. in a screw extruder with an increasing temperature profile.

After the termination of the extrusion process or kneading process the obtained resin powder including the luminescent substance is ground to the grain size corresponding to the respective application.

According to a preferred embodiment, so-called plasticizers are admixed to the thermoplastic polymer particles, for example diethylhexyl adipate, dibutyl phthalate or diisononyl phthalate. As substance classes there can be employed here di-esters of phthalic acid, di-esters of the adipic acid and di-esters of the sebacic acid with long-chained mono alcohols (2-ethylhexanol, isononanol, decyl alcohol, fatty alcohols, benzyl alcohol, glycol ether), tri-ester of citric acid, phosphoric acid ester of long-chained aliphatic alcohols, dibenzoic acid ester of aliphatic alcohols, esters of fatty acids with aliphatic alcohols, di-esters of polyethylene glycol ethers, esters of resin acids with long-chained aliphatic alcohols, plasticizers on the basis of epoxidized fatty-acid ester or epoxidized oils, carbon plasticizers and chlorinated paraffin. This allows the mechanical properties of the polymer to be adjusted. In particular, the receptivity of the core material for particular luminescent substances can be increased.

Preferably, 0.1 to 5 weight percent plasticizers relative to the mass of the core material, further preferably 0.2 to 2%, particularly preferably 0.3 to 0.6%, are admixed.

According to a particularly preferable embodiment, the thermoplastic cores consist of polymethyl methacrylate (PMMA) or polystyrene (PS) and the duromer matrix consists of an isocyanate-based addition polymer, the addition polymer being a polyurethane or polyurea.

Besides the stated preferred variants (variants 1 to 3), still further variants of capsule luminescent pigments are theoretically conceivable, which differ in the type and kind of the polymers used for core and shell and in the type of manufacture.

Independently of the variant chosen for the manufacture of the respective capsule luminescent pigments, in the following sometimes different capsule luminescent pigments are mentioned. Two capsule luminescent pigments are also considered different even if only the respective luminescent substances or the luminescent substance combinations in the core of the pigments differ from each other. Example: Red luminescing capsule luminescent pigments according to variant 1 with a first luminescent substance and green luminescing capsule luminescent pigments according to variant 1 with a second luminescent substance are two different kinds of capsule luminescent pigments, although they were respectively manufactured analogously according to variant 1.

Furthermore, the formulation "luminescence ink system" is utilized. A luminescence ink system according to the invention is a plurality of special luminescent pigments, the capsule luminescent pigments, which each have different color impressions of the luminescence emission. By a mixture of the capsule luminescent pigments, an arbitrary color impression of the luminescence can be set within the color system.

As already mentioned, one obtains a series of advantages, compared to the prior art, through the use of luminescence ink systems which are based on capsule luminescent pigments.

With their similar size and surface condition there is achieved as a further advantage an adjustment of the printing properties between the individual capsule luminescent pigments. An adjustment of the light fastness of the capsule luminescent pigments can be achieved by the suitable choice of the luminescent substances or by a targeted mixture of luminescent substances of different stabilities which are distributed in the core of the capsule luminescent pigments.

The capsule luminescent pigments further have numerous application advantages. For example, all the different inks manufactured therefrom possess the same printing properties, that is, e.g. no segregation of the different capsule luminescent pigments occurs in the printing lacquer, no different behaviour of the printing inks occurs on the printing machine, and there is required only one single ink formulation system for all creatable luminescence color tones.

The capsule luminescent pigments according to the invention generate colored (VIS) emissions upon UV irradiation, but preferably possess no (absorption-based) inherent color or only a weak inherent color, so that under normal conditions an imprint on the value document is not recognizable in room light.

For eliminating the disadvantages of the prior art, a luminescence ink system was developed which consists of at least two, preferably at least three capsule luminescent pigments, which
  possess the same size,
  the same surface chemistry and a
  similar specific weight; (this solves the application problem, i.e. the continuity in manufacturing and printing the inks. Due to the selection and the quantitative share of the luminescent substances, the specific weight of different capsule luminescent pigments can differ by up to 20% without impairing the color incorporation.);
  possess a similar chemical stability (This solves the problem that the luminescent substances of the prior art behave differently upon solvent contact.);
  possess a similar light fastness (this solves the problem that the luminescent substances of the prior art behave differently in sunlight and under UV irradiation.);
  are freely mixable with each other (this allows that arbitrary mixed inks of the luminescence ink system can be formed).

The technical solution according to the invention is based in particular on the facts that
  the luminescent substances are embedded in a polymer matrix (core), thereby, on the one hand, their relative luminescence being increased (lower concentration quenching compared with concentrated luminescent substance) and, on the other hand, a first protection against chemical attacks being effected;
  the core is provided with an additional shell from a second, different polymer, thereby, on the one hand, preferably a complementary protection against chemical attacks being effected (the shell is stable against substances which could attack the core, the core is stable against substances which could attack the shell) and, on the other hand, the compatibility or the free mixability of all the pigments being ensured (the same surface);
  preferably all the pigments possess the same (or similar) grain size (or grain size distribution).

The luminescence ink system according to the invention is based preferably on an RGB system, because in this way a greater color space can be covered and in particular by additive color mixture a white color impression can be produced. An RGB system is hence particularly suitable for true-color representations or other, more complex printed images.

According to a preferred embodiment, there hence exist at least three different capsule luminescent pigments whose emissions respectively correspond to the primary colors red, green and blue. In certain cases it can be advantageous to use in addition to these three pigments or instead of the red-luminescing pigment a yellow-luminescing pigment, thereby arising an alternative three-color system (yellow, green, blue) or an extended four-color system (red, yellow, green, blue). The reason for this is the high technical difficulty in manufacturing light-stable red emission colors without strong inherent coloring. Hence, the substitution of the red-luminescing pigments, e.g. in yellow-luminescing mixed inks can be advantageous. Likewise, the substitution of another color can also be advantageous depending on the required light stabilities and the printed image.

According to a further preferred embodiment, hence, three differently luminescing capsule luminescent pigments or at least four differently luminescing capsule luminescent pigments are employed, which do not necessarily correspond to the primary colors red, green and blue.

In certain cases, however, a reduced luminescence ink system is desirable, for example when on a value document there are only red and green luminescing regions or mixed colors derived therefrom such as e.g. yellow tones. In this case, a two-color system from red and green is sufficient and technically less elaborate or simpler to apply.

According to a further preferred embodiment, hence, two differently luminescing capsule luminescent pigments are employed. In particular, the combinations of the capsule luminescent pigments with the emission colors red with green, red with blue, green with blue, yellow with blue, yellow with green, and yellow with red are preferred here.

Even one single capsule luminescent pigment according to the invention already has advantages, as described above, over the prior art, since its high luminescence intensity and its high chemical stability enable the simultaneous loading of the printing ink with further solids, e.g. machine-readable feature substances.

According to another preferred embodiment, therefore, only one single capsule luminescent pigment is employed, preferably in combination with a machine-readable feature sub stance.

According to a preferred embodiment, the capsule luminescent pigments form at at least one place on the value document in their mixture a white color impression of the emission, for example by the combination of red, green and blue luminescing capsule luminescent pigments.

If several capsule luminescent capsule-pigments form a mixture or if several capsule luminescent pigments are printed on different places of the same value document, they must show a comparable stability behaviour in order to prevent that the color tone changes or the printed image becomes non-uniform. For example in the case of a printed white-red flag, by dissolving out the red-luminescing luminescent substances the white-luminescing part of the flag would change its color to turquoise and the red-luminescing part would grow pale or disappear.

For preventing a change of the luminescence color impression by the migration of a luminescent substance, by the destruction of a luminescent substance through acids or bases, or by dissolving out a luminescent substance through organic solvents, the luminescent pigments used must have an exceptionally high chemical stability. According to the invention, preferably special capsule luminescent pigments are used therefor.

Preferably, the different capsule luminescent pigments differ only with respect to quantity of loading and the kind of luminescent substance in the core and otherwise are almost entirely identical with respect to shell material and core material. This facilitates the joint printability of the capsule luminescent pigments and there arise technical advantages for the luminescence ink system, e.g. only one lacquer formulation for several different printing inks must be held in stock. Further application advantages are e.g. the higher storage stability of the printing ink, because there occurs no segregation on account of different physical properties of the capsule luminescent pigments, and an identical behaviour of the different capsule luminescent pigments in the printing machine or upon printing.

By contrast, with classical luminescent pigments the formulations of the printing inks must be respectively adjusted to the luminescent pigments included therein, i.e. the supply and storage of a plurality of different formulations and formulation components are necessary. Likewise, the combination of luminescent pigments with incompatible properties is often problematic with classical luminescent pigments of the prior art.

Due to the similarity of the capsule luminescent pigments according to the invention, these can be arbitrarily mixed with each other as powder before the incorporation into an ink to set a certain luminescence color tone, or different, already manufactured inks can be arbitrarily mixed with each other to set a certain luminescence color tone.

Furthermore, with the core-shell structure it is achieved that the chemical stability of the capsule luminescent pigments is independent of the chemical stability of the chosen luminescent substances. If one carries out a qualitative stability test of printed patterns, a classification into the following levels is often used:

4: no visible alteration
3: minor alteration
2: significant alteration, less than 50% damaged
1: severe alteration, more than 50% damaged
0: element destroyed The qualitative evaluation of the stability is effected with the help of the above-mentioned levels 0-4 by viewing the excited proof with the eye.

The quantitative evaluation is effected by measuring the emission spectrum with the help of a fluorescence spectrometer.

As experience has shown, proofs with the level 4 ("no visible alteration") possess a luminescence intensity remaining after the test of more than 80% relative to the original luminescence intensity. This is referred to as a stability of more than 80% in the following.

To enable the stability of the capsule luminescent pigments to be judged qualitatively and quantitatively, in the following an application-focused test method is described.

In this test method, the stability of the capsule luminescent pigments in an offset printing lacquer is determined, since here, among other things due to the lower proof thickness and the higher pigmentation connected therewith, distinctly more precise quantitative statements on the stability of the pigments can be made than in corresponding intaglio printing inks. However, the corresponding results can be easily transferred to steel intaglio printing inks. Luminescent pigments, which lead to a significant loss of intensity in offset proofs, are also unsuitable for intaglio printing and also lead to a loss of intensity or to a "smearing" or "running out" of the luminescence impression.

Test method A5 or A30:
Incorporating the capsule luminescent pigments into an offset lacquer with a pigmentation of 15 weight percent with a three-roll mill
proofing the such obtained printing ink by offset printing with a weight of the proof of 2 g/m² onto bond paper ("bank note paper")
drying the proof at 60° C. for 12h
immersing the proof (or a cut-off part of the proof) in the respective test substance, against which the stability of the proof is to be ascertained, for a period of 5 minutes (A5) or 30 minutes (A30)
removing the proof from the test substance and washing off adhering test substance with water
drying the proof at 60° C. for 2h
The quantitative stability of the proof against the test substance results from the comparison of the intensity of the luminescence emission of the proof before and after the treatment with the test substance (or from the comparison of an untreated part of the proof with a treated part of the same print); stability=(intensity after treatment with solvent)/(intensity before treatment with solvent)

The capsule luminescent pigments including luminescent substances according to the present invention in proofs achieve the highest level 4 or a stability of >80% for application-relevant solvents, acids and bases, even when proofs of the same unprotected luminescent substance only achieve the lowest level 0.

According to a preferred embodiment, the highest stability level "no visible alteration" or a stability of >80%, preferably >90%, is present in the following application-relevant solvent tests according to test method A5, particularly preferably according to test method A30:

Determining the stability against polar organic solvents (test substance ethyl acetate), non-polar organic solvents (test substance toluene), aqueous acids (test substance HCl, 5 weight percent), aqueous bases (test substance NaOH, 2 weight percent), as well as aqueous redox-active solutions (test substance sodium hypochlorite solution, 5% active chlorine). Here, the exposure time is 5 or preferably 30 minutes to ensure that a sufficiently long contact between luminescent pigment and test substance takes place.

According to a further preferred embodiment, the stated stabilities are fulfilled by the capsule luminescent pigments for the following application-relevant solvents:
ethanol
trichloroethylene
tetrachloroethylene
xylol
light gasoline
sodium sulphite solution (10 weight percent)
sulfuric acid (2 weight percent)
ammonia solution (10 weight percent)

Generally, it is to be noted that the printing ink used for the test or the substrate printed on must be stable in the test, this is generally fulfilled by the printing inks and substrates which are used for the security printing of value documents. The stability of the printing ink/of the substrate can be checked, for example, with inert luminescent substances (e.g. inorganic phosphorus).

According to a preferred embodiment, the capsule luminescent pigments are stable even against especially aggressive chemical solvents for at least 5 minutes, e.g. acetone. In particular, acetone is capable of attacking most of the luminescence color imprints of the prior art.

Preferably, upon a quantitative determination of the luminescence strengths by machine the different capsule luminescent pigments show, before and after an exposure to chemicals, an intensity deterioration of the luminescence intensity of less than 20%, preferably less than 10%, particularly preferably less than 5%.

In particular, the difference between the luminescence intensities of the capsule luminescent pigments having different luminescence emissions, normalized to the initial value, is less than 20 percentage points, preferably less than 10 percentage points, particularly preferably less than 5 percentage points. This means that the different pigments behave in the same way even upon the occurrence of a low intensity loss by exposure to chemicals and, hence, no recognizable alteration of the relative color ratios occurs. For example, after chemical treatment a first capsule luminescent pigment (e.g. red) can still possess 96% of its initial intensity and a second capsule luminescent pigment (e.g. green) still 95% of its initial intensity. Hence, they differ from each other only by one percentage point.

Here, two kinds of capsule luminescent pigments within the framework of the test method A5 or A30 have a substantially same chemical stability, when test strips with proofs of both capsule luminescent pigments withstand all chosen test solutions (preferably: ethyl acetate, toluene, HCl 5%, NaOH 2%, sodium hypochlorite 5% active chlorine) with in each case >80% remaining luminescence intensity, relative to the respective initial intensity. Here, for every test solution a new test strip is used.

According to a preferred embodiment, the color difference in the color impression of the luminescence emission caused by treatment with chemicals within the framework of the stability tests, relative to the color impression of the luminescence emission before the chemical treatment, is for mixtures of the capsule luminescent pigments of the invention $\Delta D<0.01$, further preferably $\Delta D<0.005$, particularly preferably $\Delta D<0.001$.

Here, $\Delta D$ designates the Euclidean distance of the x, y coordinates of the standard tristimulus values of the luminescence emission on the CIE standard color chart: $\Delta D = [(x_1-x_2)^2+(y_1-y_2)^2]^{0.5}$.

This similarity of the chemical stabilities of the different capsule luminescent pigments achieves that no visible shift of the color tones, e.g. by a single luminescence color component dissolving from a mixture, can occur.

To avoid a change of the luminescence color tone through different light fastnesses of the capsule luminescent pigments, the different capsule luminescent pigments must have a sufficiently high and sufficiently similar light fastnesses.

The light fastness is determined here via the European blue wool scale usual for the light fastness determination of absorption inks, e.g. analogous to the standard EN ISO 105-B01:1999, instead of the (absorbent) color impression, however, the intensity of the luminescence emission at the different points of the blue wool scale being determined. A point of the blue wool scale is considered to be achieved, when after a treatment still more than 50% of the original luminescence intensity can be measured.

To enable the light fastness of the capsule luminescent pigments to be judged quantitatively, in the following an application-focused test method is described.

Here, too, for a better quantitative determination of the stability an offset printing lacquer is used to produce a thin homogeneous proof, since differences in the layer thickness of the proof also lead to differences in its light stability.

Test method B:

Incorporating the capsule luminescent pigments into an offset lacquer with a pigmentation of 15 weight percent with a three roll mill proofing the such obtained printing ink by offset printing with a weight of the proof of 2 g/m² onto bond paper ("bank note paper")

drying the proof at 60° C. for 12h

Inserting the proof into a Xenon light test chamber (or equivalent light fastness determination device) and irradiation according to the European blue wool scale for the desired blue wool scale level The quantitative light fastness of the proof results from the comparison of the intensity of the luminescence emission of the proof before and after treatment (or from the comparison of an untreated part of the proof with a treated part of the same proof); normalized intensity at blue wool scale level=(intensity at blue wool scale level)/(intensity before treatment)

Preferably, the capsule luminescent pigments achieve at least blue wool scale 3, that is, at blue wool scale 3 they still possess a normalized intensity of more than 50%.

Preferably, the different capsule luminescent pigments have substantially the same light fastness, i.e. the intensities normalized to the initial value of the different capsule luminescent pigments differ at blue wool scale 3 from each other, according to test method B, by less than 30 percentage points, further preferably less than 20 percentage points, particularly preferably less than 10 percentage points. This ensures that the correct color impression of mixed inks is still present e.g. even after long solar radiation or after strong UV irradiation by machine.

For example, at blue wool scale 3 a first capsule luminescent pigment can still possess 61% of its initial intensity and a second capsule luminescent pigment can still possess 65% of its initial intensity. They thus differ from each other by only 4 percentage points.

In certain cases, however, various luminescent substances show a different course in their light stability. For example, after a short irradiation (blue wool scale 1) a luminescent substance can show a significant intensity deterioration and then stabilize, while a different luminescent substance has a continuous intensity deterioration, so that at the end both luminescent substances again possess the same relative intensity, but for an interim period they differed from each other. In this case, upon a short irradiation duration one would perceive a shift of the luminescence color tone, which disappears upon longer irradiation.

To avoid this effect, preferably the intensities of the different capsule luminescent pigments normalized to the initial value differ according to test method B at blue wool scale 1 by less than 30 percentage points, further preferably less than 20 percentage points, particularly preferably less than 10 percentage points. Furthermore, preferably the intensities of the different capsule luminescent pigments normalized to the initial value differ according to test method B at blue wool scale 2 by less than 30 percentage points, further preferably less than 20 percentage points, particularly preferably less than 10 percentage points.

According to a preferred embodiment, the color difference of the color impression of the luminescence emission at blue wool scale 3, relative to the color impression of the luminescence emission before the blue wool scale test, according to test method B for capsule luminescent pigment mixtures is $\Delta D<0.03$, preferably $\Delta D<0.02$, particularly preferably $\Delta D<0.01$. According to a further preferred embodiment, the color difference for capsule luminescent pigment mixtures according to test method B at blue wool scale 2 is $\Delta D<0.03$, preferably $\Delta D<0.02$, particularly preferably $\Delta D<0.01$. According to a further preferred embodiment, the color difference for capsule luminescent pigment mixtures according to test method B is $\Delta D<0.03$, preferably $\Delta D<0.02$, particularly preferably $\Delta D<0.01$.

Here, $\Delta D$ designates the Euclidean distance of the x, y coordinates of the standard tristimulus values of the luminescence emission on the CIE standard color chart: $\Delta D=[(x_1-x_2)^2+(y_1-y_2)^2]^{0.5}$.

This similarity of the light fastness of the different capsule luminescent pigments achieves that no visible shift of the color tones, e.g. by a single luminescence color component bleaching out from a mixture, can occur.

According to a preferred embodiment, in at least one capsule luminescent pigment a mixture of several luminescent substances with different courses of the light stability is employed for adapting the course of the light stability. For example, a mixture of a continuously stable luminescent substance and a small portion of an unstable luminescent substance which already bleaches out at blue wool scale 1 behaves identically to a single luminescent substance which shows a low deterioration of the luminescence intensity upon short irradiation duration and then remains stable.

According to a further preferred embodiment, a mixture of two capsule luminescent pigments with substantially the same color impression but different light fastnesses is employed to achieve in sum substantially the same light fastness as a third capsule luminescent pigment with different color impression of the luminescence emission.

Thus, for the different capsule luminescent pigments for two different blue wool scale levels identical normalized luminescence intensities are achieved and for the other times approximately adapted. The viewer thus sees no significant differences in the luminescence intensities and color tones of the different capsule luminescent pigments or the mixtures thereof.

Furthermore, it is possible to influence the light stability of a first luminescent substance by adding a second luminescent substance, even when the excitation radiation is only capable of exciting the first luminescent substance. For this purpose, the second luminescent substance must be capable of taking over the excitation energy of the first luminescent substance by energy transfer, as a result of which the light fastness of the first luminescent substance significantly increases.

According to a preferred embodiment, in at least one capsule luminescent pigment an energy transfer system between two luminescent substances is utilized. One of the two luminescent substances is preferably a luminescent substance excitable in the UV region which emits in the visible region, and the other of the two luminescent substances is a luminescent substance excitable in the visible region which emits in the visible region.

According to a preferred embodiment, the luminescent substance is a fluorescence substance. According to a further preferred embodiment, the luminescent substance is a phosphorescence substance. According to a further preferred embodiment, the luminescent substance is a luminescent substance excitable in the UV region which emits in the visible spectral region. According to a further preferred embodiment, it is a luminescent substance excitable in the visible spectral region which emits in the visible spectral region. The luminescent substances can be purely organic molecules as well as metalorganic complexes. Explicitly excluded are purely inorganic luminescent substances. Although these often have excellent light stabilities and chemical stabilities, they do not achieve the luminescence intensity of organic luminescent substances.

According to a preferred embodiment, two or more luminescent substances are mixed to establish an energy transfer system or FRET system in which after excitation the first luminescent substance can give off its excitation energy partially or completely to the second luminescent substance. In case of such a FRET system, one of the involved luminescent substances is excitable preferably in the UV region and emits in the visible spectral region, while the other luminescent substance is excitable in the visible spectral region and emits in the visible spectral region.

Examples of substance classes of luminescent substances which are UV-excitable or excitable in the visible spectral region and emit in the visible spectral region are purely organic luminescent substances and luminescent metal complexes. Possible substance classes are, for example, diarylpolyenes, diarylethenes, arylacetylenes, oxazoles, pyrazoles, benzazoles, anthrones, quinones, cyanines, rhodamines, oxazines, phenoxazines, thiazines, phenothiazines, perylenes, terylenes, coumarins, benzoxazinones or benzothiazinones as well as rare-earth metal complexes, such as e.g. β-diketonate rare-earth metal complexes or dipicolinate rare-earth metal complexes, and here preferably neutrally charged rare-earth metal complexes. Other organic luminescent substance classes can also be employed.

In particular, as a substance class for luminescent substances excitable in the visible spectral region which emit in the visible there are preferably used perylene dyes because of their high light stability.

Examples of FRET systems are, e.g., mixtures from a green-yellow excitable fluorescence substance and a green-yellow emitting fluorescence substance, for example a mixture with a weight ratio of 1:15 from 2,9-bis(2,6-diisopropylphenyl)anthra[2,1,9-def:6,5,10-d'e'f']diisochinolin-1,3,8,10(2H,9H)-tetraone ($C_{48}H_{42}N_2O_4$, a green-excitable perylene substance which possesses an orange luminescence emission, in the further designated as "F-orange") and N-(2-(4-oxo-4H-benzo[d][1,3]oxazine-2-yl)phenyl)naphthalene-2-sulfonamide ($C_{24}H_{16}N_2O_4S$, a UV-excitable luminescent substance which has a green luminescence emission, in the following designated as "F-green").

According to a preferred embodiment, the capsule luminescent pigment hence includes an energy transfer system (FRET system), preferably a FRET system from a UV-excitable luminescent substance as a donor and a luminescent substance excitable in the visible region as an acceptor. Preferably, the acceptor is a perylene dye.

According to a preferred embodiment, the capsule luminescent pigments of the invention are excitable with UV-A radiation (i.e. in the wavelength region of 315 nm to 380 nm), in particular at 365 nm. According to a further preferred embodiment, the capsule are excitable with UV-B radiation (i.e. in the wavelength region of 280 nm to 315 nm), in particular at 311 nm. According to a further preferred embodiment, the capsule luminescent pigments are excitable with UV-C radiation (i.e. in the wavelength region of 100 nm to 280 nm), in particular at 254 nm. According to a further preferred embodiment, two luminescence ink systems are produced, which can be excited separately in the UV-A (preferably 365 nm) and UV-C (preferably 254 nm) and show different colors, respectively. For example, three printed places of a value document under UV-A appear red, green and blue, respectively, the same places under UV-C irradiation appear in other colors, e.g. yellow, blue, violet. This is realizable with two different methods. On the one hand, in one printing ink there can be present a mixture of different, respectively UV-A- or UV-C-excitable capsule luminescent pigments. On the other hand, in one printing ink there can be included a capsule luminescent pigment which includes a mixture of different, respectively UV-A- or UV-C-excitable luminescent substances.

According to a further preferred embodiment, the at least one capsule luminescent pigment according to the invention can be excited with both UV-A radiation and UV-C radiation. Preferably, the capsule luminescent pigment upon excitation with UV-A and UV-C radiation respectively shows different emission spectra.

Particularly preferably, all the capsule luminescent pigments are excitable both with UV-A radiation and with UV-C radiation, and upon excitation with UV-A and UV-C radiation respectively show different emission spectra.

According to a further preferred embodiment, at least one capsule luminescent pigment of the luminescence ink system is excitable both with UV-A radiation and with UV-C radiation, and upon excitation with UV-A and UV-C radiation respectively shows a different emission spectrum, and at least one further capsule luminescent pigment of the luminescence ink system upon excitation with UV-A and UV-C radiation respectively shows the same emission spectrum.

According to a further preferred embodiment, the at least one capsule luminescent pigment can be excited with both UV-A radiation and UV-C radiation. Preferably, the capsule luminescent pigment upon excitation with UV-A and UV-C radiation respectively shows the same emission spectrum.

Particularly preferably, all the capsule luminescent pigments of the luminescence ink system are excitable both with UV-A radiation and with UV-C radiation, and upon excitation with UV-A and UV-C radiation respectively show the same emission spectra.

Luminescence ink systems with differently excitable components are generally known in the prior art (see e.g. EP 2602119 A1).

The luminescent substances employed in the core of the capsule luminescent pigments can be fluorescent (quickly decaying) or phosphorescent (slowly decaying) substances.

Most of the purely organic luminescent substances are fluorophores and emit after excitation already after a few nanoseconds. However, some luminescent substances may develop, e.g. after excitation, an excited triplet state which only slowly, i.e. phosphorescently, transitions into the initial state by light emission. Likewise, many metalorganic complexes show a slow decay time in the region of microseconds to milliseconds. The scientific classification of different substances into fluorescence and phosphorescence, however, is controversially discussed and not uniformly defined. Hence, for the purposes of this invention the differentiation in fluorescent and phosphorescent substances is hence based solely on the length of the decay time of the luminescence emission.

The aspect of the decay time is of importance for value documents in particular for the machine readability on automated sensors. Here, preferably the phosphorescence of the imprints of the value document is measured, because this can be measured independently of the disturbing fluorescence of the background and independently of the impurities etc.

Within the scope of this invention, substances with a decay time of >50 µs, hence, are deemed to be phosphorescent, and substances with a decay time of <50 µs as fluorescent, because the border for an easy distinguishability by machine lies in this region.

According to a preferred embodiment, the at least one luminescent substance employed is a slowly decaying (phosphorescent) substance, preferably a luminescent substance with a decay time of more than 50 µs, particularly preferably more than 100 µs. In particular, it is preferably a rare-earth complex with a decay time of more than 100 µs.

Independently of whether the luminescence of the printed image is evaluated by machine, several application advantages arise here through the use of capsule luminescent pigments. Only through the similar light fastnesses and chemical stabilities of all the capsule luminescent pigments of the luminescence ink system according to the invention a reliable machine evaluation is possible.

For example, no drifts due to ageing are observed upon examining the different color components, i.e. the luminescence color ratios remain constant. In particular, it cannot occur that a color component is no longer detectable because of having grown pale or because of the impact of a solvent. Hence, there is always measured the correct entire printed image, which significantly simplifies an authenticity determination. Upon the use of a mixture of the luminescent pigments according to the prior art, which respectively possess different properties, however, often false signals are generated, e.g. because a luminescence marking was smeared by the impact of solvents (e.g. upon a lacquering of the bank note for increasing the soiling resistance) and hence the marking does no longer have the position and size expected by the sensor, or because due to environmental factors, such as humidity and solar radiation, an individual color component was destroyed and hence the measured luminescence printed image does not match the expected luminescence printed image.

According to a preferred embodiment, the capsule luminescent pigments possess no or only a weak (absorption-based) inherent coloring. This enables a printed image to be applied on the value document, which for the human eye is not or hardly visible and becomes visible only upon UV irradiation. Likewise, the remaining (absorption-based) colored image of the value document is not disturbed by the imprint of the luminescent printing inks. For example, on a bank note there can be printed in an otherwise white or bright region of the bank note an invisible symbol which does not strike the viewer at daylight, but is clearly recognizable in the dark upon UV irradiation. Preferably, the (absorption-based) color difference caused by the capsule luminescent pigment (e.g. in comparison to an imprint without capsule luminescent pigment) is $\Delta E<10$, further preferably $\Delta E<5$, particularly preferably $\Delta E<2$.

Here, $\Delta E$ designates the Euclidean distance of the (L*, a*, b*) coordinates of the two (absorption-based) color locations.

According to a further preferred case of embodiment, the capsule luminescent pigments possess an (absorption-based) inherent coloring. The imprint with the luminescent printing inks is then visible, and e.g. can be part of the remaining (absorption-based) colored image of the value document.

According to a further preferred embodiment, the printing ink of the capsule luminescent pigments includes additional (non-luminescent, absorption-based) body coloring pigments to color the imprint in targeted fashion, or the capsule luminescent pigment is added to a "normal" printing ink. The luminescent pigment is thus applied simultaneously with the rest of the colored image of the bank note. For example, the capsule luminescent pigment is added to the intaglio printing ink of an infrared split of a bank note series, which already includes a coloring pigment and an absorber pigment.

According to a preferred case of application, the (absorption-based) body color and the color impression of an imprint of the intaglio printing ink of the invention, which is emitted by luminescence, are the same.

This enables the imaging of, e.g., a multicolor flag or a portrait of a state's person in color on the value document and then upon irradiation with UV light recognizing the same colored image through the luminescence in the dark.

According to a preferred case of application, the capsule luminescent pigments of the luminescence ink system have uniform grain sizes. The pigments preferably possess a grain size (d99) smaller than 15 µm, particularly preferably smaller than 10 µm, very particularly preferably smaller than 6 µm.

According to a preferred embodiment, the grain sizes (d99) of the capsule luminescent pigments with different luminescence emissions differ from each other by less than 30%, further preferably by less than 20%, particularly preferably by less than 10%.

According to a further preferred embodiment, the grain size (d50) of the capsule luminescent pigments with different luminescence emissions differ from each other by less than 30%, further preferably by less than 20%, particularly preferably by less than 10%.

According to a preferred embodiment, still further admixtures are employed besides the capsule luminescent pigments, in order to achieve certain effects in the application. This includes, for example, the machine-readable feature substances according to the invention. Further typical additives are, e.g., brighteners, stabilizers, emulsifiers, substances adjusting the refractive index, diluents, scents, etc.

EMBODIMENT EXAMPLES

Example 1: Intaglio Printing Ink Having a Magnetic Feature Substance and Red and Green Capsule Luminescent Pigments with Thermoplastic Core and Condensation-Polymer Shell As a magnetic feature substance there is used a magnetite pigment C4 provided with several layers of silicon oxide or titanium oxide, whose manufacture is described, for example, in the print EP1179507A1 (Example 3). Due to the multiple coating, the pigment possesses only a slight whitish-yellow inherent coloring.

As a red-luminescing pigment a capsule luminescent pigment with a polymethyl-methacrylate core and a melamine-formaldehyde shell is used, which as luminescent substances dissolved in the core includes a mixture of the three luminescent substances N-(2-(4-oxo-4H-benzo[d][1,3]oxazine-2-yl)phenyl)naphthalene-2-sulfonamide ($C_{24}H_{16}N_2O_4S$), 2,9-bis(2,6-diisopropylphenyl)-5,6,12,13-tetraphenoxyanthra[2,1,9-def: 6,5,10-d'e'f']diisochinolin-1,3,8,10(2H,9H)-tetraone ($C_{72}H_{58}N_2O_8$), and $Eu(TTA)_3(TPPO)_2$ (TTA=thenoyltrifluoroacetone; TPPO=triphenylphosphine oxide). It corresponds to a capsule luminescent pigment according to the preferred variant 1.

The luminescent substance $Eu(TTA)_3(TPPO)_2$ here serves in particular for adapting the light fastness at blue wool scale 1 between the red-luminescing and green-luminescing capsule luminescent pigments of this embodiment example.

Manufacture of the Red Capsule Luminescent Pigment:

27 g of polymethyl methacrylate (PMMA) of average mol mass 100000 g/mol, 1500 mg N-(2-(4-oxo-4H-benzo[d][1,3]oxazine-2-yl)phenyl)naphthalene-2-sulfonamide, ($C_{24}H_{16}N_2O_4S$), 100 mg 2,9-bis(2,6-diisopropylphenyl)-5,6,12,13-tetraphenoxyanthra[2,1,9-def:6,5,10-d'e'f']diisochinolin-1,3,8,10(2H,9H)-tetraone ($C_{72}H_{58}N_2O_8$), 100 mg Eu(TTA)$_3$(TPPO)$_2$ and 250 mg dibutyl phthalate are dissolved under stirring in 500 g of dichloromethane (solution A).

78 g melamine and 111 g paraformaldehyde are stirred in 1000 g water at 60° C. for 60 minutes, thereby forming a clear solution. The solution is filtered via a filter paper to remove possibly present nondissolved particles (solution B).

In 2475 g of water 25 g of sodium dodecyl sulfate are dissolved (solution C). Solution A is added to solution C and dispersed for 30 seconds with a disperser tool (Ultraturrax). During this time 200 ml of solution B and 10 ml of acetic acid are added. Subsequently, the dispersion is further stirred with a magnetic stirrer.

After 2h of stirring at room temperature the dispersion is heated to 39° C. and held at this temperature for 3h to evaporate the dichloromethane. Subsequently, further 200 ml of the solution B are added and the temperature is increased to 70° C. This temperature is held for further 3h. The obtained particles are separated from the solution, washed with water and dried at 60° C.

Approx. 60 g of a pigment luminescing red upon irradiation with UV light of the wavelength 365 nm are obtained.

As a green-luminescing pigment there is used a capsule luminescent pigment with a polymethyl-methacrylate core and a melamine-formaldehyde shell, which includes N-(2-(4-oxo-4H-benzo[d][1,3]oxazine-2-yl)phenyl)naphthalene-2-sulfonamide ($C_{24}H_{16}N_2O_4S$) as a luminescent substance dissolved in the core. It corresponds to a capsule luminescent pigment according to the preferred variant 1.

Manufacture of the Green Capsule Luminescent Pigment:

27 g of polymethyl methacrylate (PMMA) of the average mol mass 100000 g/mol, 1500 mg N-(2-(4-oxo-4H-benzo[d][1,3]oxazine-2-yl)naphthalene-2-sulfonamide ($C_{24}H_{16}N_2O_4S$) and 250 mg dibutyl phthalate are dissolved under stirring in 500 g of dichloromethane (solution A).

78 g melamine and 111 g paraformaldehyde are stirred in 1000 g water at 60° C. for 60 minutes, thereby forming a clear solution. The solution is filtered via a filter paper to remove possibly present nondissolved particles (solution B).

In 2475 g of water 25 g of sodium dodecyl sulfate are dissolved (solution C). Solution A is added to solution C and dispersed for 30 seconds with a disperser tool (Ultraturrax). During this time 200 ml of solution B and 10 ml of acetic acid are added. Subsequently, the dispersion is further stirred with a magnetic stirrer.

After 2h of stirring at room temperature the dispersion is heated to 39° C. and held at this temperature for 3h to evaporate the dichloromethane. Subsequently, further 200 ml of the solution B are added and the temperature is increased to 70° C. This temperature is held for further 3h. The obtained particles are separated from the solution, washed with water and dried at 60° C.

Approx. 60 g of a pigment fluorescing green upon irradiation with UV light of the wavelength 365 nm are obtained.

Both pigments luminesce under UV excitation with 365 nm. When in the following one speaks of these pigments or of inks or proofs derived therefrom "luminescing", this means that they luminesce under UV excitation with 365 nm.

The formulation of the intaglio printing ink is based on the bank-note-compatible formulation "Green F" of Table 3 in the print WO1992019689A1, where, instead of the 24 weight percent of the filler calcium carbonate, the following components are used: 22 weight percent of the magnetic pigment C4, as well as 1 weight percent of the green capsule luminescent pigment and 1 weight percent of the red capsule luminescent pigment. The viscosity of the intaglio printing ink at 40° C. is set to approx. 12 Pas.

If a value document is printed with the obtained intaglio printing ink in the intaglio printing method, the proof shows a green body color and possesses both machine-readable magnetic properties and a yellow luminescence.

The capsule luminescent pigments used have a chemical stability according to test method A30 or A5 of more than 97% for all the chemicals described therein. Accordingly, also the intaglio prints do not show any noticeable change in luminescence after contact with these chemicals.

The change in the color impression of the luminescence ΔD of a 1:1 mixture of red and green capsule luminescent pigments according to test method B is less than 0.005 according to the blue wool scale 3 passed. Thus, also the intaglio prints do not show any noticeable shift in the color tone of the luminescence after prolonged light irradiation.

If instead of the capsule luminescent pigments one utilizes, for example, red and green inorganic luminescent pigments with a pigmentation of respectively 10 weight percent, this will only be possible if 18 weight percent of one or several of the further printing ink components are replaced. However, high demands are made regarding intaglio printing inks. Among other things, the rheological properties must be suitable for the application, the evaporation rate of the ink must be set, and the finished proof must be highly resistant to damage when washing and folding the bank note. Such a high replacement of printing ink components thus inevitably leads to a massive deterioration of the properties.

If, alternatively, instead of the capsule luminescent pigments one utilizes, for example, red and green organic luminescent substances in the same pigmentation of respectively 1 weight percent, the formulation can be created without replacing further printing ink components. But, however, upon a contact of the proof with organic solvents, the luminescent substances can be dissolved out, which then leads to one or several of the following disadvantages: Loss of luminescence intensity, change in the color impression of the luminescence and "smearing" of the luminescence image.

Furthermore, individual organic luminescent substances often have different light stabilities. Without additional adjustment of the light stability, e.g. by admixing further luminescent substances, the color impression of the luminescence will change with longer light irradiation. Admixing further unprotected luminescent substances, however, further increases the susceptibility to attacks by various solvents.

The formulation according to the invention with capsule luminescent pigments thus offers decisive advantages and allows the manufacture of a multifunctional intaglio printing ink employable in bank note printing.

Example 2: Intaglio Printing Ink Having an NIR Absorber and Red and Green Capsule Luminescent Pigments with Duromer Core and Condensation-Polymer Shell As a red-luminescing pigment a capsule luminescent pigment with a polyurea core and a melamine-formaldehyde shell is used, which as luminescent substances distributed or dissolved in the core includes a mixture of the three luminescent substances N-(2-(4-oxo-4H-benzo[d][1,3]oxazine-2-yl)phenyl)naphthalene-2-sulfonamide ($C_{24}H_{16}N_2O_4S$), 2,9-bis(2,6-diisopropylphenyl)-5,6,12,13-tetraphenoxyanthra[2,1,9-def: 6,5,10-d'e'f']diisochinolin-1,3,8,10(2H,9H)- tetraone ($C_{72}H_{58}N_2O_8$), and $Eu(TTA)_3(TPPO)_2$ (TTA=thenoyltrifluoroacetone; TPPO=triphenylphosphine oxide). It corresponds to a capsule luminescent pigment according to the preferred variant 2.

The luminescent substance $Eu(TTA)_3(TPPO)_2$ here serves in particular for adapting the light fastness at blue wool scale 1 between the red-luminescing and green-luminescing capsule luminescent pigments of this embodiment example.

Manufacture of the Red Luminescent Pigment:

In a laboratory kneader the components
70.5 g of isophorone diisocyanate,
24.2 g benzamide,
15.2 g N-(2-(4-oxo-4H-benzo[d][1,3]oxazine-2-yl)phenyl)naphthalene-2-sulfonamide ($C_{24}H_{16}N_2O_4S$),
0.6 g 2,9-bis(2,6-diisopropylphenyl)-5,6,12,13-tetraphenoxyanthra[2,1,9-def:6,5,10-d'e'f']diisochinolin-1,3,8,10 (2H,9H)-tetraone ($C_{72}H_{58}N_2O_8$),
6.1 g $Eu(TTA)_3(TPPO)_2$
are kneaded at 140° C. for 30 min. Subsequently, 25.10 g of melamine are added and the mixture is kneaded until solidifying. The obtained powder is ground with an agitator ball mill having zirconium oxide grinding balls of approx. 1 mm to a grain size (d99) of 10 µm.

100 g of this powder are given in 1.3 l of water and dispersed with a homogenizer. To this mixture there are given 900 ml of a 20%-aqueous solution of hexahydroxymethylmelamine and dosed with 8 ml of concentrated acetic acid. The obtained reaction mixture is heated for 2h at 70° C. The obtained coated pigment is centrifuged and washed with 3 l of water. After a last centrifugation step the pigment is dried at 60° C. in a drying oven.

Approx. 175 g of a pigment luminescing red upon irradiation with UV light of the wavelength 365 nm are obtained.

As a green-luminescing pigment there is used a capsule luminescent pigment with a polyurea core and a melamine-formaldehyde shell, which includes N-(2-(4-oxo-4H-benzo[d][1,3]oxazine-2-yl)phenyl)naphthalene-2-sulfonamide ($C_{24}H_{16}N_2O_{45}$) as a luminescent substance distributed or dissolved in the core. It corresponds to a capsule luminescent pigment according to the preferred variant 2.

Manufacture of the Green Luminescent Pigment:

In a laboratory kneader the components
73.2 g of isophorone diisocyanate,
26.1 g benzamide,
15.3 g N-(2-(4-oxo-4H-benzo[d][1,3]oxazine-2-yl)phenyl)naphthalene-2-sulfonamide ($C_{24}H_{16}N_2O_4S$),
are kneaded at 140° C. for 30 min. Subsequently, 25.10 g of melamine are added and the mixture is kneaded until solidifying. The obtained powder is ground with an agitator ball mill having zirconium oxide grinding balls of approx. 1 mm to a grain size (d99) of 10 µm.

100 g of this powder are given in 1.3 l of water and dispersed with a homogenizer. To this mixture there are given 900 ml of a 20%-aqueous solution of hexahydroxymethylmelamine and dosed with 8 ml of concentrated acetic acid. The obtained reaction mixture is heated for 2h at 70° C. The obtained coated pigment is centrifuged and washed with 3 l of water. After a last centrifugation step the pigment is dried at 60° C. in a drying oven.

Approx. 175 g of a pigment fluorescing green upon irradiation with UV light of the wavelength 365 nm are obtained.

Both pigments luminesce under UV excitation with 365 nm. When in the following one speaks of these pigments or of inks or proofs derived therefrom "luminescing", this means that they luminesce under UV excitation with 365 nm.

The formulation of the intaglio printing ink is based on the bank note-compatible formulation of the embodiment example 2 in the print EP1790701B2, which describes an intaglio printing ink having 35 weight percent of a colourless inorganic NIR absorber and 15 weight percent of the filler calcium carbonate. Within the framework of this embodiment example, instead of 15 weight percent calcium carbonate only 13 weight percent calcium carbonate are employed, and 1 weight percent of the red capsule luminescent pigment and 1 weight percent of the green capsule luminescent pigment. The viscosity of the intaglio printing ink at 40° C. is set to approx. 10 Pas.

If a value document is printed with the obtained intaglio printing ink in the intaglio printing method, the proof shows no or only a very low body color and both a machine-readable specific signature in the infrared absorption and a yellow luminescence.

The capsule luminescent pigments used have a chemical stability according to test method A30 or A5 of more than 97% for all the chemicals described therein. Accordingly, also the intaglio prints do not show any noticeable change in luminescence after contact with these chemicals.

The change in the color impression of the luminescence ΔD of a 1:1 mixture of red and green capsule luminescent pigments according to test method B is less than 0.01 according to the blue wool scale 3 passed. Thus, also the intaglio prints do not show any noticeable shift in the color tone of the luminescence after prolonged light irradiation.

Example 3: Intaglio Printing Ink Having a Phosphorescent Feature Substance and Blue and Green Capsule Luminescent Pigments with Several Thermoplastic Cores and Addition-Polymer Shell As a phosphorescent feature substance there is used an inorganic phosphor pigment without body color which consists of particles of a samarium-doped lanthanum aluminium germanate $LaAlGe_2O_7:Sm_{0.03}$ with a particle size (D99) of 12 µm. The manufacture is effected via mixing the respective individual element oxides in the stoichiometric ratio followed by a calcination in air at 1250° C. for 12 hours and grinding to the target grain size.

When excited with light of the wavelength 404 nm, the phosphor pigment shows a structured red-orange phosphorescence emission with three main bands in the wavelength region between 550 nm and 650 nm and a decay time of approximately 1.7 milliseconds.

As a blue luminescing pigment there is used a capsule luminescent pigment with several polymethyl-methacrylate cores and a polyurea shell, which includes 2,5-thiophendiyl-bis(5-tert-butyl-1,3-benzoxazole) as a luminescent substance dissolved in the cores. It corresponds to a capsule luminescent pigment according to the preferred variant 3.

Manufacture of the Blue Luminescent Pigment:

50 g of PMMA with an average mol weight of 100000 g/mol are dissolved with 5 g of 2,5-thiophendiylbis(5-tert-butyl-1,3-benzoxazole) ($C_{26}H_{26}N_2O_2S$) in 1 liter chloroform. The mixture is given into a reactor with 5 liters of an aqueous solution of 1% sodium dodecyl sulfate and dispersed with a homogenizer for 5 min. Subsequently, the chloroform is evaporated under stirring at 500 mbar. The remaining aqueous phase includes, after removal of the chloroform, approx. 55 g spheres of PMMA having an average particle size of approx. 2 µm, which include the dissolved luminescent substance (in the following referred to as "PMMA B"). With an ultracentrifuge the particles are washed three times with respectively 1 liter water and subsequently dried at 60° C.

In a laboratory kneader the components
79.63 g of the isocyanurate trimer of isophorone diisocyanate
22.46 g benzamide
2.00 g urea
14.12 g melamine
10 g PMMA B
are kneaded at 180° C. until solidifying. The obtained pellets are ground to a grain size (d99) of 11 μm.

Approx. 50 g of a pigment luminescing blue upon irradiation with UV light of the wavelength 365 nm are obtained.

As a green-luminescing pigment there is used a capsule luminescent pigment with several polymethyl-methacrylate cores and a polyurea shell, which includes N-(2-(4-oxo-4H-benzo[d][1,3]oxazine-2-yl)phenyl)naphthalene-2-sulfonamide ($C_{24}H_{16}N_2O_4S$) as a luminescent substance dissolved in the core. It corresponds to a capsule luminescent pigment according to the preferred variant 3.

Manufacture of the Green Luminescent Pigment:

50 g of PMMA with an average mol weight of 100000 g/mol are dissolved with 5 g N-(2-(4-oxo-4H-benzo[d][1,3]oxazine-2-yl)phenyl)naphthalene-2-sulfonamide ($C_{24}H_{16}N_2O_4S$) in 1 liter of dichloromethane. The mixture is given into a reactor with 5 liters of an aqueous solution of 1% sodium dodecyl sulfate and dispersed with a homogenizer for 5 min. Subsequently, the dichloromethane is evaporated under stirring at 500 mbar. The remaining aqueous phase includes, after removal of the dichloromethane, approx. 55 g spheres of PMMA having an average particle size of approx. 2 μm, which include the dissolved luminescent substance (in the following referred to as "PMMA G"). With an ultracentrifuge the particles are washed three times with respectively 1 liter water and subsequently dried at 60° C.

In a laboratory kneader the components
79,63 g of the isocyanurate trimer of isophorone diisocyanate
22.46 g benzamide
2.00 g urea
14.12 g melamine
10 g PMMA G
are kneaded at 180° C. until solidifying. The obtained pellets are ground to a grain size (d99) of 11 μm.

Approx. 50 g of a pigment fluorescing green upon irradiation with UV light of the wavelength 365 nm are obtained.

Both pigments luminesce under UV excitation with 365 nm. When in the following one speaks of these pigments or of inks or proofs derived therefrom "luminescing", this means that they luminesce under UV excitation with 365 nm.

The formulation of the intaglio printing ink is based on the bank note-compatible formulation of the embodiment example 10, table 8 in the print U.S. Pat. No. 5,569,701, which describes a green intaglio printing ink with 37.83 weight percent of the filler calcium carbonate. Within the framework of this embodiment example, a part of the calcium carbonate is replaced by the phosphorescent feature substance and the capsule luminescent pigments, so that the phosphorescent feature substance has a portion of 30 weight percent of the intaglio printing ink and the blue and green capsule luminescent pigments each have a portion of 2 weight percent. The viscosity of the intaglio printing ink at 40° C. is set to approx. 10 Pas.

If a value document is printed with the obtained intaglio printing ink in the intaglio printing method, one obtains a proof with green body color and both a machine-readable spectral structure in the phosphorescence emission and a blue-green luminescence.

The capsule luminescent pigments used have a chemical stability according to test method A30 or A5 of more than 80% for all the chemicals described therein. Accordingly, also the intaglio prints do not show any strong change in luminescence after contact with these chemicals.

The change in the color impression of the luminescence ΔD of a 1:1 mixture of blue and green capsule luminescent pigments according to test method B is less than 0.002 according to the blue wool scale 3 passed. Thus, also the intaglio prints do not show any noticeable shift in the color tone of the luminescence after prolonged light irradiation.

Example 4: Intaglio Printing Ink Having a Magnetic Feature Substance and Red, Green and Blue Capsule Luminescent Pigments with Thermoplastic Core and Condensation-Polymer Shell This example is a variation of the intaglio printing ink of example 1. In addition to the red and green capsule luminescent pigments, blue capsule luminescent pigments are employed to set up an RGB color system.

The blue capsule luminescent pigment is here a pigment of the preferred variant 1 which is structured and manufactured analogously to the red and green capsule luminescent pigments, but which includes 5 weight percent, relative to the core mass, of the luminescent substance 4,4'-bis(benzoxazole-2-yl)stilbene ($C_{28}H_{18}N_2O_2$). All three capsule luminescent pigments luminesce upon UV irradiation with 365 nm.

If the total pigmentation of the intaglio printing ink remains the same, the color impression of the luminescence can now be adjusted in wide ranges by varying the relative portions of red, green and blue capsule luminescent pigments.

In a first preferred embodiment, the relative portions of red, green and blue capsule luminescent pigments are selected such that a white color impression of the luminescence arises.

In a second preferred embodiment, the relative portions of red, green and blue capsule luminescent pigments are selected such that the color impression of the luminescence matches the color impression of the body color of the intaglio printing ink.

In a third preferred embodiment, the relative portions of red, green and blue capsule luminescent pigments are selected such that the color impression of the luminescence matches the complementary color of the color impression of the body color of the intaglio printing ink.

Example 5: Intaglio Printing Ink Having an NIR Absorber and Red, Green and Blue Capsule Luminescent Pigments with Duromer Core and Condensation-Polymer Shell This example is a variation of the intaglio printing ink of example 2. In addition to the red and green capsule luminescent pigments, blue capsule luminescent pigments are employed to set up an RGB color system.

The blue capsule luminescent pigment is here a pigment of the preferred variant 2 which is structured and manufactured analogously to the red and green capsule luminescent pigments, but which includes 5 weight percent, relative to the core mass, of the luminescent substance 4,4'-bis(benzoxazole-2-yl)stilbene ($C_{28}H_{18}N_2O_2$). All three capsule luminescent pigments luminesce upon UV irradiation with 365 nm.

If the total pigmentation of the intaglio printing ink remains the same, the color impression of the luminescence can now be adjusted in wide ranges by varying the relative portions of red, green and blue capsule luminescent pigments.

In a first preferred embodiment, the relative portions of red, green and blue capsule luminescent pigments are selected such that a white color impression of the luminescence arises. Proofs manufactured with such an intaglio printing ink show no or only a very low body color, i.e. they are "invisible" proofs which, however, luminesce white upon irradiation with UV light of the wavelength 365 nm.

In a second and third preferred embodiment, a body color pigment is additionally added to the intaglio printing ink, so that it assumes an inherent color, e.g. the color pigment "C.I." Pigment Blue 15:3" is incorporated with 3 weight percent into the ink and in turn the amount of calcium carbonate is reduced by 3 weight percent in order to achieve a blue body color.

In the second preferred embodiment, the relative portions of red, green and blue capsule luminescent pigments are selected such that the color impression of the luminescence matches the color impression of the body color of the intaglio printing ink.

In the third preferred embodiment, the relative portions of red, green and blue capsule luminescent pigments are selected such that the color impression of the luminescence matches the complementary color of the color impression of the body color of the intaglio printing ink.

Example 6: Intaglio Printing Ink Having a Phosphorescent Feature Substance and Red, Green and Blue Capsule Luminescent Pigments with Several Thermoplastic Cores and Addition-Polymer Shell This example is a variation of the intaglio printing ink of example 3. In addition to the blue and green capsule luminescent pigments, red capsule luminescent pigments are employed to set up an RGB color system.

The red capsule luminescent pigment here is a pigment of the preferred variant 3 which is structured and manufactured analogously to the blue and green capsule luminescent pigments and which at the same time includes, relative to the core mass, 5.5 weight percent of the luminescent substance N-(2-(4-oxo-4H-benzo[d][1,3]oxazine-2-yl)phenyl)naphthalene-2-sulfonamide ($C_{24}H_{16}N_2O_4S$), 0.35 weight percent of the luminescent substance $Eu(TTA)_3(TPPO)_2$ and 0.35 weight percent of the luminescent substance 2,9-bis(2,6-diisopropylphenyl)-5,6,12,13-tetraphenoxyanthra[2,1,9-def:6,5,10-d'e'f']diisoquinoline-1,3,8,10(2H,9H)-tetraone ($C_{72}H_{58}N_2O_8$). All three capsule luminescent pigments luminesce upon UV irradiation with 365 nm.

If the total pigmentation of the intaglio printing ink remains the same, the color impression of the luminescence can now be adjusted in wide ranges by varying the relative portions of red, green and blue capsule luminescent pigments.

In a first preferred embodiment, the relative portions of red, green and blue capsule luminescent pigments are selected such that a white color impression of the luminescence arises.

In a second preferred embodiment, the relative portions of red, green and blue capsule luminescent pigments are selected such that the color impression of the luminescence matches the color impression of the body color of the intaglio printing ink.

In a third preferred embodiment, the relative portions of red, green and blue capsule luminescent pigments are selected such that the color impression of the luminescence matches the complementary color of the color impression of the body color of the intaglio printing ink.

Example 7: Intaglio Printing Ink Having a Magnetic Feature Substance and a Green Capsule Luminescent Pigment with Thermoplastic Core and Condensation-Polymer Shell This example is a variation of the intaglio printing ink of example 1, in where besides the magnetic feature substance only the green capsule luminescent pigment is used.

The formulation of the intaglio printing ink is based on the bank-note-compatible formulation "Green F" of Table 3 in the print WO1992019689A1, where, instead of the 24 weight percent of the filler calcium carbonate, the following components are used: 23 weight percent of the magnetic pigment C4, as well as 1 weight percent of the green capsule luminescent pigment.

If a value document is printed with the obtained intaglio printing ink in the intaglio printing method, the proof shows a green body color and possesses both machine-readable magnetic properties and a green luminescence.

The invention claimed is:

1. A multifunctional intaglio printing ink including at least one capsule luminescent pigment and at least one further machine-readable feature substance,
    wherein the at least one capsule luminescent pigment has at least one core with a luminescent substance and one shell encapsulating the at least one core,
    wherein the at least one core comprises a thermoplastic polymer or an organic addition polymer,
    wherein the luminescent substances respectively are organic or metalorganic luminescent substances, and
    wherein the shell consists of a condensation polymer or an organic addition polymer, and wherein the intaglio printing ink at 40° C. has a viscosity in a range of 3 Pas to 25 Pas.

2. The intaglio printing ink according to claim 1, including at least two capsule luminescent pigments which have different emission spectra of luminescence emission,
    wherein for each of the at least two capsule luminescent pigments a material of the at least one core, a material of the shell, and a thickness of the shell are configured such that the at least two capsule luminescent pigments have a substantially same chemical stability.

3. The intaglio printing ink according to claim 1, wherein the at least one further machine-readable feature substance is selected from: NIR absorbers, magnetic substances and luminescent substances.

4. The intaglio printing ink according to claim 1, further comprising more than 10 weight percent of the at least one further machine-readable feature substance.

5. The intaglio printing ink according to claim 1, further comprising at least one body color pigment.

6. The intaglio printing ink according to claim 1, wherein the intaglio printing ink comprises less than 80 weight percent of the at least one machine-readable feature substance and the at least one capsule luminescent pigment; or
wherein the intaglio printing ink comprises less than 80 weight percent of the at least one machine-readable feature substance, the at least one capsule luminescent pigment and at least one body color pigment.

7. The intaglio printing ink according to claim 1, further comprising which comprises at least three capsule luminescent pigments, each of the at least three capsule luminescent pigments providing a different color impression of luminescence emission,
wherein the respective color impressions of the luminescence emission are red, green or blue.

8. A printing method comprising printing a print substrate with an intaglio printing ink according to claim 1, the method comprising applying the intaglio printing ink to the print substrate by intaglio printing,
wherein the print substrate is a paper substrate or a polymer substrate, or
wherein the print substrate consists of a combination of paper and polymer.

9. A printed product obtainable by the printing method according to claim 8, wherein the printed product is a value document.

10. A printed product comprising a substrate having a first part and a second part, wherein at least the first part of the substrate is printed with a first intaglio printing ink and at least the second part of the substrate is printed with a second intaglio printing ink,
wherein at least the first intaglio printing ink includes at least one capsule luminescent pigment and at least one further machine-readable feature substance,
wherein the at least one capsule luminescent pigment has at least one core with a luminescent substance and one shell encapsulating the at least one core,
wherein the at least one core comprises a thermoplastic polymer or an organic addition polymer,
wherein the luminescent substances respectively are organic or metalorganic luminescent substances, and
wherein the shell consists of a condensation polymer or an organic addition polymer, and wherein the intaglio printing ink at 40° C. has a viscosity in a range of 3 Pas to 25 Pas.

11. The printed product according to claim 10, wherein the second intaglio printing ink can be distinguished from the first intaglio printing ink by a machine-readable feature.

12. The printed product according to claim 11, wherein the machine-readable feature is selected from: NIR absorption, magnetization and luminescence.

13. The printed product according to claim 11, wherein the second intaglio printing ink does not include any machine-readable feature substance and the first intaglio printing ink includes a machine-readable feature substance.

14. The printed product according to claim 11, wherein the second intaglio printing ink includes a different machine-readable feature substance than the first intaglio printing ink.

15. The printed product according to claim 10, wherein the second intaglio printing ink differs from the first intaglio printing ink in color impression of its body color.

16. The printed product according to claim 10, wherein the first and the second intaglio printing ink have a same color impression of body color; wherein the first and the second intaglio printing ink additionally include at least one body color pigment.

17. A multifunctional intaglio printing ink including at least one capsule luminescent pigment and at least one further machine-readable feature substance,
wherein the at least one capsule luminescent pigment has at least one core provided with a luminescent substance and one shell encapsulating the at least one core,
wherein the at least one core consists essentially of a thermoplastic polymer or an organic addition polymer,
wherein the luminescent substances respectively are organic or metalorganic luminescent substances, and
wherein the shell consists of a condensation polymer or an organic addition polymer, and
wherein the intaglio printing ink at 40° C. has a viscosity in a range of 3 Pas to 25 Pas.

* * * * *